US006636781B1

(12) United States Patent
Shen et al.

(10) Patent No.: US 6,636,781 B1
(45) Date of Patent: Oct. 21, 2003

(54) DISTRIBUTED CONTROL AND COORDINATION OF AUTONOMOUS AGENTS IN A DYNAMIC, RECONFIGURABLE SYSTEM

(75) Inventors: Wei-Min Shen, Rancho Palos Verdes, CA (US); Behnam Salemi, Los Angeles, CA (US); Peter Will, Los Altos Hills, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 10/155,489

(22) Filed: May 22, 2002

Related U.S. Application Data

(60) Provisional application No. 60/292,801, filed on May 22, 2001.

(51) Int. Cl.[7] .............................................. G06B 19/418
(52) U.S. Cl. ..................... 700/248; 700/189; 700/249; 700/250; 700/251; 700/262; 700/254; 318/568.11; 701/23; 703/1; 703/2; 703/7
(58) Field of Search ................................ 700/245, 254, 700/189, 100, 248–251, 262, 86; 318/568.11; 703/1, 2, 7; 701/23; 714/763, 764, 766, 770, 772; 403/171–174, 176; 52/250, 259

(56) References Cited

U.S. PATENT DOCUMENTS

| 6,233,502 B1 | * | 5/2001 | Yim .......................... 700/245 |
| 6,233,503 B1 | * | 5/2001 | Yim et al. .................. 700/245 |
| 6,243,622 B1 | * | 6/2001 | Yim et al. .................. 700/245 |
| 6,459,957 B1 | * | 10/2002 | Bennett et al. ............. 700/245 |
| 6,477,444 B1 | * | 11/2002 | Bennett et al. ............. 700/245 |

OTHER PUBLICATIONS

Shen et al., Hormone–inspired adaptive communicaiton and distributed control for conro self–reconfigurable robots, 2002, IEEE, pp. 700–712.*
Yim et al., Modular robots, 2002, IEEE, Internet, pp. 30–34.*
Lee et al., A self–reconfigurable dual–arm system, 1991, IEEE, pp. 164–169.*
Matsumoto et al., System design of the hyper–OSV (orbital servicing vehicle), no date, Internet, pp. 1–6.*
Fujita, M., H. Kitano and K. Kageyama, "Reconfigurable Physical Agents" in International Conference on Autonomous Agents. 1988.

(List continued on next page.)

*Primary Examiner*—William A. Cuchlinski, Jr.
*Assistant Examiner*—McDieunel Marc
(74) *Attorney, Agent, or Firm*—Fish & Richardson, P.C.

(57) ABSTRACT

Systems and techniques are described for distributed control and coordination of autonomous agents in a system. A protocol for distributed control allows autonomous agents to negotiate a group task for the agents, such as locomotion or self-reconfiguration in a robot application, and to synchronize individual agent actions to effect the group task. A protocol for adaptive communication allows autonomous agents, such as physically coupled self-sufficient robot modules, to continuously discover changes in their local topology. In general, in one implementation, the technique includes: discovering a local topology, which includes a type of a communication connection to autonomous agents in the reconfigurable network topology, and determining an action based upon a received control message and the determined local topology.

38 Claims, 8 Drawing Sheets

OTHER PUBLICATIONS

Fukuda, T., and Y. Kawauchi, "Cellular Robotic System (CEBOT) As One Of The Realization Of Self–Organizing Intelligent Universal Manipulator," in Proceedings of IEEE International Conference on Robotics and Automation. 1998.

Kotay, K., D. Rus, M., M. Vona, and C. McGray, "The Self–Reconfiguring Robotic Molecule ," in Proceedings of IEEE International Conference on Robotics and Automation, 1998.

Murata, S., H. Kurokawa, E. Toshida, K. Tomita, and S. Kokaji, "A 3–D Self Reconfigurable Structure," in Proceedings of IEEE International Conference on Robotics and Automation, 1998.

Neville B., and A. Anderson, "Tetrabot Family Tree: Modular Synthesis Of Kinematic Structures For Parallel Robotics," in Proceedings of IEEE International Symposium on Robotics Research, 1996.

Yoshida, E., S. Murata, K. Tomita, H. Kurokawa, and S. Kokaji, "Disributed Formation Control Of A Modular Mechanical System," in Proceedings of International Conference on Intelligent Robots and Systems, 1997.

Ihara, H., K. Mori, "Autonomous Decentralized Computer Control Systems," IEEE Computer, 1984 17(8): p. 57–66.

Arkin, R., "Integrating Behavioral, Perceptual, and World Knowledge in Reactive Navigation," in Designing Autonomous Agents–Theory and Practice from Biology and Back, P. Meas, Editor, 1990, MIT Press: Cambridge, MA.

Arkin, R.C., "Homeostatic Control for a Mobile Robot: Dynamic Replanning in Hazardous Environments," Journal of Robotic Systems, 1992 9(2):p. 197–214.

Shen, W.–M., Y. Lu, P. Will, "Hormone–based Control for Self–Reconfigurable Robots," in International Conference on Autonomous Agents, 200, Barcelona, Spain.

Yim, M., D.G. Duff, K.D. Roufas, "Polybot: A Modular Reconfigurable Robot," in Proceedings of the IEEE International Conference on Robotics and Automation, 2000.

Bojinov, H., A. Casal, T. Hogg, "Multiagent Control of Self–Reconfigurable Robots," in ICMAS, 2000, Boston, MA, USA.

Lee, W.H., Sanderson A.C., "Dynamic Rolling, Locomotion Planning, and Control of an Icosahedral Modular Robot," in International Conference on Intelligent Robots and Systems, 2000.

Castano, A., Will P., "Mechanical Design of a Module for Reconfigurable Robots," in IC–IROS, 2000.

Kotay, K., Rus D., "Algorithms for Self–Reconfiguring Molecule Motion Planning," in IC–IROS, 2000.

Rus, D., Vona, M., "A Basis for Self–Reconfiguring Robots Using Crystal Modules," in IC–IROS, 2000.

Chirikjian, G.S., A. Pamecha, I. Ebert–Uphoff, "Evaluating Efficiency of Self–Reconfiguration in a Class of Modular Robots," Journal of Robotic Systems, 1996, 13(5): p. 317–338.

Murata, S., H. Kurokawa, S. Kokaji, "Self–assembling Machine," in Proceedings of the IEEE International Conference on Robotics Automation, 1994.

Yoshida, E., S. Murata, H. Kurokawa, K. Tomita, S. Kokaji, "self–A Distributed Reconfiguration Method for 3–D Homogenous Structure," in Proc. IEEE/RSJ Intl. Conf. Intelligent Robotics and Systems, 1998.

Lee, W.H., A.C. Sanderson, "Dynamics and Distributed Control of Tetrabot Modular Robots," in Proc. of IEEE Int Conf on Robotics and Automation, 1999, Detroit, MI.

Shen, W.–M., P. Will, "Docking in Self–Reconfigurable Robots," in International Conference on Intelligent Robots and Systems, 2001 (submitted).

Salemi, B., W.–M., Shen, P. Will, "Hormone–Controlled Metamorphic Robots," in International Conference on Robotics and Automation, 2001, Seoul, Korea.

Unsal C., H. Kiliccote, P.K. Khosla, "A Modular Self–Reconfigurable Biparite Robotic System: Implementation and Motion Planning," Autonomous Robots, 2001, 10:p. 23–40.

Tomita, K., S. Murata, H. Kurokawa, E. Toshida, S. Kokaji, "Self–Assembly and Self–Repair Method for a Distributed Mechanical System," IEEE Trans. on Robotics and Automation, 1999, 15(60: p.1035–1045.

Murata, S., E. Yoshida, H. Kurokawa, K. Tomita, S. Kokaji, "Self–Repairing Mechanical Systems," Autonomous Robots, 2001 10:p.–21.

Lee, W.H., A.C. Sanderson, "Dynamic Analysis and Distributed Control of the Tetrabot Modular Reconfigurable Robotic System," Autonomous Rotobs, 2001, 10: p. 67–82.

H. Bojinov, A. Casal, and T. Hogg, "Emergent Structures in Modular Self–Reconfigurable Robots," in Proceedings of the IEEE int. conf. on Robotics & Automation, vol. 2, pp. 1734–1741, San Francisco, USA, 2000.

J.W Burdick, J. Radford, and G.S. Chirikjian, "A 'Sidewinding' Locomotion Gait for Hyper–Redundant Robots," in Proceedings of the IEEE int. conf. on Robotics & Automation, pp. 101–106, Atlanta, USA, 1993.

B. Khoshnevis, B. Kovac, W.–M. Shen, and P. Will, "Reconnectable Joints for Self–Reconfigurable Robots," in Proceedings of the IEEE/RSJ int. conf. on Intelligent Robots and Systems, Maui, Hawaii, USA, 2001.

K. Kotay, D. Rus, M. Vona, and C. McGray, "The Self–reconfigurable Robotic Molecule," in Proceedings of the IEEE int. conf. on Robotics & Automation, pp. 424–431, Leuven, Belgium, 1998.

D. Rus and M. Vona, "A Physical Implementation of the Self–reconfiguring Crystalline Robot," in Proceedings of the IEEE int. conf. on Robotics & Automation, pp. 1726–1733, San Francisco, USA, 2000.

C. Unsal and P.K. Khosla, "Mechatronic Design of a Modular Self–reconfiguring Robotic System," in Proceedings of the IEEE int. conf. on Robotics & Automation, pp. 1742–1747, San Francisco, USA, 2000.

Khoshnevis, B., A. Castano, R. Kovac, W.–M. Shen, P. Will, "Reconnectable Joints for Self–Reconfigurable Robots," in International Conference on Intelligent Robots and Systems, 2001.

Castano, A., P. Will, "Mechanical Design of a Module for Reconfigurable Robots," in International Conference on Intelligent Robots and Systems, 2000, Takamatsu, Japan.

Shen, W.–M., P. Will, "Docking in Self–Reconfigurable Robots," in International Conference on Intelligent Robots and Systems, 2001, Hawaii.

Nilsson, M. "Why Snake Robots Need Torsion–free Joints and How to Design Them," in Proceedings of International Conference on Robotics and Automation, 1998.

I.–M. Chen and J. Burdick, "Enumerating the Non–isomorphic Assembly Configurations of Modular Robotic Systems," in Proc. IEEE/RSJ Intl. Conf. Intell. Robots Systems, pp. 1985–1992, 1993.

S. Farritor, S. Dubowsky, N. Rutman, and J. Cole, "A Systems–level Modular Design Approach to Field Robotics," in Proc. IEEE Int. Conf. Robotics Automat., pp. 2890–2895, 1996.

A. Castano, W.-M. Shen, and P. Will, "CONRO: Towards Deployable Robots with Inter–robot Metamorphic Capabilities," Autonomous Robots Journal, vol. 8, pp. 309–324, Aug. 2000.

Yim M., (1994) "New Locomotion Gaits," in Proc. IEEE Intl. Conf. Robot. Autom., 2508–2514, 1994.

Poi G., Scarebeo C., Allota B., (1998) "Traveling Wave Locomotion Hyper–redundant Mobile Robot," in Proc. IEEE Intl. Conf. Robot. Autom., 418–423, 1998.

I.-M. Chen and J. Burdick, "Determining Task Optimal Modular Robot Assembly Configurations," in Proc. IEEE Int. Conf. Robotics Automat., pp. 1132–1137, 1995.

G. Chirikjian and J. Burdick, "Kinematics of Hyper–redundant Robot Locomotions with Applications to Grasping," in Proc. IEEE Int. Conf. Robotics Automat., pp. 720–725, 1991.

K. Furuta and M. Sampei, "Path Control of a Three–dimensional Linear Motional Mechanical System Using Laser," IEEE Trans. Industrial Electronics, 35(1): 52–59, Feb. 1988.

R. Wallace and J.M. Selig, "Scaling Direct Drive Robots," in Proc. IEEE Int. Conf. Robotics Automat., pp. 2947–2953, 1995.

G. Chirikjian, A. Pamecha, "Bounds for Self–Reconfiguration of Metamorphic Robots," Proceedings of the 1996 IEEE International Conference on Robotics and Automation, 1996.

A. Pamecha, G. Chirikjian, "A Useful Metric for Modular Robot Motion Planning," Proceedings of the 1996 IEEE International Conference on Robotics and Automation, 1996.

H. Kurokawa, A. Kamimura, and S. Kokaji, "Hardware Design of Modular Robotic System," Proc. of 2000 IEEE/RSJ Int. Conf. On Intelligent Robots and Systems (IROS2000).

E. Yoshida,. S. Murata, A, Kamimura, K. Tomita, H.Kurokawa, S. Kokaji, "A Motion Planning Method for a Self–Reconfigurable Modular Robot," Proceedings of the 2001 IEEE International Conference on Robotics and Automation, 2001.

A. Kamimura, S. Murara, E. Yoshida, H. Kurokawa, K. Tomita, and S. Kokaji, "Self–Reconfigurable Modular Robot–Experiments on Reconfiguration and Locomotion," Proceedings of the 2001 IEEE International Conference on Robotics and Automation, 2001.

Paredis, et al., "Design of Modular Fault Tolerant Manipulators", Proceedings of the First Workshop on Algorithmic Foundations of Robotics, 1995.

Yim, "Locomotion with a unit–modular reconfigurable robot" *A dissertation submitted to the Department of Mechanical Engineering and the Committee on Graduate Studies*, Stanford University, 1994 (Abreviated Version).

Mori, et al., "Autonomous decentralized computer system and software structure", *Computer Systems Science and Engineering*, vol. 1, No. 1, pp. 17–22, Oct., 1985.

Shen, et al., "Hormones for Self–Reconfigurable Robots", *Intelligent Autonomous Systems 6*, pp. 918–925, IOS Press, 2000.

Mori, "Autonomous decentralized system technologies and their application to train transport operation system" High Integrity Software Conference, Albuquerque, New Mexico, 1999.

Fahlman, "Three Flavors of Parallelism" Carnegie Mellon University, Pittsburgh, PA, 1982.

Stoy, et al., "How to Make a Self–Reconfigurable Robot Run", Joint Conference of ICAMS and Autonomous Agents, 2002.

Stoy, et al., "Global Locomotion from Local Interaction in Self–Reconfigurable Robots", $7^{th}$ *International Conference on Intelligent and Autonomous Systems*, 2002.

Kotay, et al., "Locomotion versatility through self–reconfiguration" *Robotics and Autonomous Systems*, 26: pp. 217–232, 1999.

Castano, et al., "Autonomous and Self–Sufficient CONRO Modules for Reconfigurable Robots", Proceedings of the $5^{th}$ International Symposium on Distributed Autonomous Robotic Systems, Knoxville, Texas, USA, pp. 155–164, 2000.

Pamecha et al., "Design and Implementation of Metamorphic Robots", Proceedings of the ASME Design Engineering Technical Conference and Computers in Engineering Conference, Irvine, California, Aug. 18–22, 1996, pp. 1–10.

Nilsson, "Symmetric Docking in 2D–a Bound on Self–Alignable Offsets", Proceedings of the IASTED International Conference, Robotics and Applications, Santa Barbara, California, pp. 7–11, Oct. 28–30, 1999.

Roufas, et al., "Six Degree of Freedom Sensing for Docking Using IR LED Emitters and Receivers", $7^{th}$ International Symposium on Experimental Robotics, Hawaii, 2000.

Fukuda, et al., "Method of Autonomous Approach, Docking and Detaching Between Cells for Dynamically Reconfigurable Robotic System CEBOT*" *Japan Soc. Mech. Eng. (JSME) International Journal, Series III*, vol. 33, No. 2, pp. 263–268, 1990.

Tomita, et al., "Development of a self–reconfigurable modular robotic system", Proceedings of SPIE vol. 4196, 2000, pp. 469–476.

Unsal, et al., "I(CES)–cubes: a modular self–reconfigurable bipartite robotic system", Part of the SPIE conference on Sensor Fusion and Decentralized Control in Robotic Systems II, Boston, Massachusetts, Sep. 1999, SPIE vol. 3839, pp. 258–269.

Yim et al., "Rhombic Dodecahedron Shape for Self–Assembling Robots", Tech. Rep. SPL–P9710777, Xerox PARC, 1997.

McKay, "Nauty User's Guide", Tech. Rpt. TR–CS–90–92, Computer Science Department, Australian Nat'l Univ., 1990.

Will, et al., "An Experimental System for computer controlled mechanical asembly", *IEEE Transactions on Computers*, vol. C–24, No. 9, Sep., 1975, pp. 879–888.

Schmitz, et al., "The CMU Reconfigurable Modular Manipulator System", Tech. Rep. CMU–RI–TR–88–07, Robotics Institute, Carnegie Mellon Institute, Pittsburgh, PA, May, 1988.

Schnonlau, "MMS: A Modular Robotic System and Model Based Control Architecture", part of the SPIE Conference on Sensor Fusion and Decentralized Control in Robotic Systems II, Boston, MA, Sep. 1999, SPIE vol. 3839, pp. 289–296.

Farritor, et al., "On Design of Rapidly Deployable Field Robotic Systems", Proceedings of the 1996 ASME Design Engineering Technical Conferences and Computers in Engineering Conference, Aug. 18–22, 1996, Irvie, California, pp. 1–13.

Paap, et al., "GMD–Snake: A semi–autonomous Snake–like Robot", *Distributed Autonomous robotic Systems 2*, Springer–Verlag Tokyo 1996.

Chang, et al., "On an Improved Algorithm for Decentralized Extrema Finding in Circular Configurations of Processors", *Communications of the ACM*, vol. 25, No. 5, pp. 336–337, May, 1982.

Pamecha, et al., "Useful Metrics for Modular Robo Motion Planning", IEEE Transactions on Robotics and Automation, vol. 13, No. 4, pp. 531–545, Aug., 1997.

Castano, et al., "CONRO: Towards Deployable Robots with Inter–Robot Metamorphic Capabilities", vol. 8, pp. 309–324, 2000.

Allen, "Time and Time Again: The Many Ways to Reprsent Time", *International Journal of Intelligent Systems*, vol. 6, pp. 341–355, 1991.

Kleinsmith, et al., *Principles of Cell Biology*, Harper & Row Publishers, Inc., 1988 (table of contents).

Alberts, et al., *Essential Cell Biology, an Introduction to the Molecular Biology of the Cell*, Garland Publishing, Inc.,, 1998, (Table of contents).

Bererton, et al., "Towards a Team of Robots with Repair Capabilities: A Visual Docking System", *Experimental Robotics VII*, LNCIS 271, pp. 333–342, 201.

Chen, "Theory and Applications of Modular Reconfigurable Robotic Systems", California Institute of Technology, 1994.

Hamlin, et al., "Tetrobot: A Modular System for Hyper–Redundant Parallel Robotics", IEEE International Conference on Robotics Automation, pp. 154–159, 1995.

Paul, *Robot Manipulators: Mathematics, Programming, and Control. The Computer Control of Robot Manipulators*, The MIT Press Series in Artificial Intelligence, The MIT Press, Cambridge, Massachusetts and London, England (table of contents).

Kobler, J., et al., *the Graph Isomorphism Problem: Its Structural Complexity*, Birkhauser, Boston, 1993 (table of contents).

Deo, N., *Graph Theory with applications to Engineering and computer Science*, Prentice–Hall, Inc., Englewood Cliffs, NJ, 1974 (table of contents).

Yim, M., *Locomotion with a Unit–Modular Reconfigurable Robot*, Dept. of Mechanical, Engineering, Stanford University, Stanford, CA, 1994.

Knowledge Revolution, *Working Model User's Manual*, 1989–1995 (table of contents).

Shen, W., et al., *Distributed and Dynamic Task Reallocation in Robot Organizations*, Information Sciences Inst. and Computer Science Dept., University of Southern California, Marina del Rey, CA.

* cited by examiner

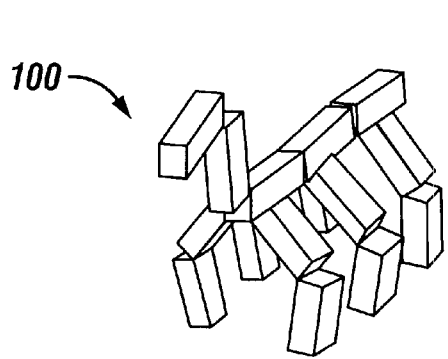
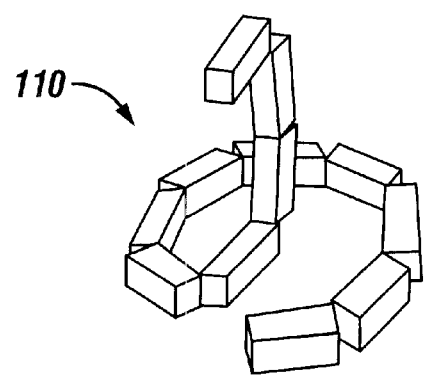
FIG. 1A  FIG. 1B
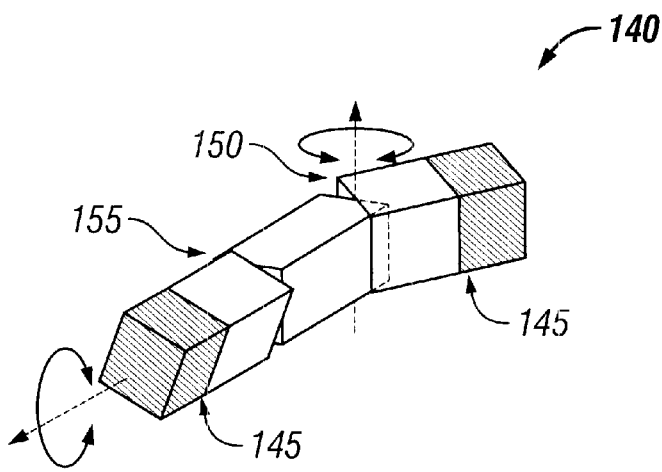
FIG. 2
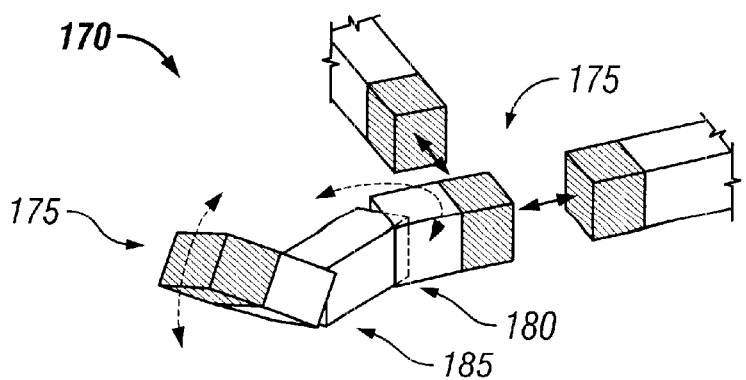
FIG. 3

DISTRIBUTED CONTROL AND COORDINATION OF AUTONOMOUS AGENTS IN A DYNAMIC, RECONFIGURABLE SYSTEM

CROSS REFERENCE TO RELATED APPLICATIONS

This application claims the benefit of the priority of U.S. Provisional Application Ser. No. 60/292,801, filed May 22, 2001 and entitled "DIGITAL HORMONES (OR HORMONE-BASED CONTROL, COMMUNICATION, AND COOPERATION FOR DYNAMICALLY NETWORKED AUTONOMOUS SYSTEMS)", the disclosure of which is hereby incorporated by reference.

STATEMENT AS TO FEDERALLY SPONSORED RESEARCH

The invention described herein was made in the performance of work under DARPA/MTO contract #DAAN02-98-C-4032, AFOSR award #F49620-97-1-0501 and AFOSR award #F49620-01-1-0020, and is subject to the provisions of Public Law 96-517 (35 U.S.C. 202) in which the contractor has elected to retain title.

BACKGROUND

Agents are software entities. Many agents may run as processes in a single computer. Agents may run in multi-processors or in computers that are connected by a communications network such as a LAN, the Internet or a wireless system. One or many agents may run in physically realized devices such as automobiles, tanks, trucks, ships or robots. They may run in modules that are used to make robots that may be homogeneous, heterogeneous, serially connected or lattice based. An agent can exhibit an individual behavior or more desirable a set of agents may exhibit a coordinated group behavior. The actual group behavior depends on both on the coordination signals and the method of communication.

Reconfigurable robots may be classified as homogeneous robots and heterogeneous robots. In a homogeneous robot and/or in a heterogeneous robot, the position of a robot module in the robot may define the module's function, or the function of the module may define its position in the robot. Reconfigurable robots also may be classified by whether their modules are organized in a lattice or not. Lattice-based robots are usually homogeneous and need to reconfigure in order to move (i.e., as their topology changes, their center of mass translates accordingly). In contrast, non-lattice robots can either translate while reconfiguring or their reconfiguration and locomotion stages can be separated. This separation allows them to reconfigure and then select an efficient configuration-dependent gait.

Both master control and master-less control systems have been proposed. In a master controlled system, a designated control module sends multiple commands to individual modules and synchronizes their actions. In a master-less control system, each module manages its own actions. To ensure synchronization between modules in a master-less control system, every module may have an internal clock that is synchronized with all the others modules.

SUMMARY

The present application teaches a biologically inspired approach to communication among and control of autonomous agents communicatively coupled together in a reconfigurable network topology. A protocol for distributed control allows autonomous agents to negotiate a group task, such as locomotion or self-reconfiguration, for the agents and to synchronize individual agent actions to effect the group task. A protocol for adaptive communication allows autonomous agents, such as physically coupled self-sufficient robot modules, to continuously discover changes in their local topology in order to collaborate and coordinated their collective actions.

According to an aspect, a local topology is discovered, where the local topology includes a type of a communication connection (e.g., number and nature of available communication links) to autonomous agents communicatively coupled together in a reconfigurable network topology. Coordination may be achieved using control messages. A control message having content is received, and, in response to the control message, an action is determined, and possibly executed, based upon the received message content and the determined local topology. Implementations of the systems and techniques described here may occur in hardware, firmware, software or a combination of these, and may include machine instructions for causing a machine to perform the operations described.

Details of one or more embodiments are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 1 illustrates two example configurations for self-reconfigurable robots.

FIG. 2 illustrates a robot module with two degrees of freedom.

FIG. 3 illustrates another robot module with two degrees of freedom.

DETAILED DESCRIPTION

Figure 4:
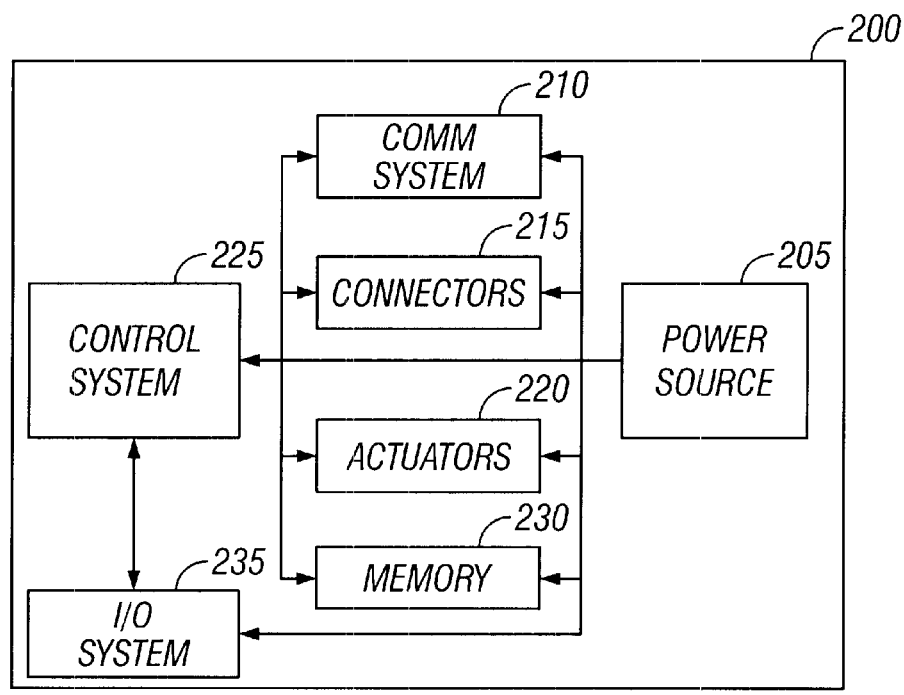
FIG. 4 is a block diagram illustrating components of a robot module.

The systems and techniques described here relate to communication among and distributed control and coordination of autonomous agents. The description that follows frequently discusses distributed control and coordination of autonomous agents in the context of self-sufficient robot modules that may physically couple together to form larger robots of various configurations. However, the systems and techniques described here are not limited to the physically coupled robot examples (e.g., static human assembled configurations, or dynamic robot selected and implemented configuration), and may apply equally to any system of autonomous agents that communicate with each other, regardless of whether the autonomous agents reside in robot modules, which may be physically coupled together.

In general, autonomous agents may form a self-reconfigurable robotic system that can change its configuration, and thus its network topology, to accomplish various tasks. For example, a self-reconfigurable robotic system may be a metamorphic robot made up of modules that can physically connect and reconnect in various ways to change the robot's shape and size to meet operational demands.

Metamorphic robots may be highly desirable in tasks such as fire fighting, search and rescue, and battlefield reconnaissance, where robots must go through unexpected situations and obstacles and perform tasks that are difficult for fixed-shape robots. For example, to maneuver through difficult terrain, a self-reconfigurable robot may transform into a snake to pass through a narrow passage, grow a few legs to climb over an obstacle, or become a ball to roll down a slope. Similarly, to enter a room through a closed door, a self-reconfigurable robot may disassemble itself into a set of smaller units, crawl under the door, and then reassemble itself in the room. To rescue a child trapped deep in rubble in an earthquake, a set of small self-reconfigurable robots may merge to form a larger robot to cooperatively carry an oxygen cylinder that would be too heavy for the original robots.

FIG. 1 illustrates two example configurations for self-reconfigurable robots. A hexapod robot 100 and a snake robot 110 are self-reconfigurable robots constructed from a set of autonomous modules. The autonomous modules can connect and reconnect to each other to form different robot configurations. All or a substantial portion of the autonomous modules may be functionally interchangeable (e.g., homogeneous both in hardware and software). Increased homogeneity among the autonomous modules may provide reduced manufacturing costs and increased operational resilience (e.g., a module may be readily replaced, such as by another module in the same robot, if the module becomes inoperative). Physical homogeneity may include two modules being mirror images of each other.

Moreover, the autonomous modules may support inter-robot metamorphing, such as merging of two self-reconfigurable robots into a larger robot or splitting of a self-reconfigurable robot into two smaller robots. Inter-robot metamorphing offers a tradeoff between the characteristics of a single large robot (e.g., high payload capacity) and the characteristics of a group of small robots (e.g., an ability to perform simple tasks in parallel). A group of small robots may explore a large area, such as the surface of a planet or a minefield. When the small robots complete this parallel operation, they may merge into a single large robot capable of carrying the tools needed to examine discoveries made during the wide-area search.

An autonomous module may have its own controller, operating system, applications software and other software modules such as agents, communication interface(s), power source, sensors, actuators, and connectors. A single autonomous module with control over its sensors and actuators can be an independent and self-sufficient robot. Multiple modules connected together can be a self-reconfigurable robot. The modules themselves can autonomously change the connections between modules, and a module may communicate with its neighbors, such as through communication connections established between connected modules.

FIG. 2 illustrates a robot module 140 with two degrees of freedom. The module 140 includes three segments connected in a chain. An independent axis of rotation is provided at both intersections of these segments. Thus, a yaw axis 150 provides the first degree of freedom (DOF) and a roll axis 155 provides the second DOF. Additional segments and/or degrees of freedom may be provided.

FIG. 3 illustrates another robot module 170 with two degrees of freedom. The module 170 also includes three segments, including a yaw axis 180 providing the first DOF. The other DOF for the module 170 is provided by a pitch axis 185, instead of a roll axis.

The module 140 includes two docking regions 145 at opposite ends of the module 140. The module 170 includes two docking regions 175 at opposite ends of the module 170. The docking regions 145, 175 may be multifaceted. Thus, a docking region may include multiple connectors for docking with multiple other modules. Moreover, the docking regions 145, 175 may be identical on either side of a module or may be different on either side of a module.

For example, a docking region may provide five connectors on five facets, where any of the five connectors can couple with any of the connectors of another module. Alternatively, the docking regions on either side of a module may have different functional characteristics, such as one docking region having a different number of connectors than the other, and/or a portion of connectors being passive connectors and the remaining connectors being active connectors.

A connector on a module may be power efficient such that the connector consumes no energy when in its default state. Moreover, a connector may provide one or more conduits for a communication interface and/or power sharing between modules.

A module may include a wireless communication system to enable remote communication, which may be used in initiating a merger of two robots. The wireless communication system may use multiple channels (e.g., a local communication channel and long range communication channel) and may be used for communication between two connected modules as well. For example, an optical transceiver, such an infrared (IR) transceiver, may serve as a communication system for both connected robot modules and for unconnected robot modules.

A robot module may be reduced in size to increase a ratio of actuator torque to module size. However, scaling down the robot module may be limited by an amount of power consumed by internal electronics, as well as performance, weight and size characteristics of available actuators and power sources. In addition, design goals, such as expected independent operation time, actuator speed and lifting power (e.g., the number of modules an actuator is expected to manipulate), can impose limits on the size of the robot module.

FIG. 4 is a block diagram illustrating components of a robot module 200. The robot module 200 includes a power source 205, a communication system 210, actuators 220, and a control system 225. The robot module 200 may also include connectors 215, a memory 230 and an input/output (I/O) system 235.

The robot module 200 may be a connectable robot module, such as described above, to be used in constructing larger self-reconfigurable robots. Alternatively, the robot module 200 may be a non-connectable robot module that is designed to operate independently but in conjunction with other similar robot modules in a larger robotic system. The adaptive communication and distributed control systems and techniques described here are applicable to such systems of autonomous agents, where teams of robots may work together on a common task.

When the robot module 200 is a connectable module, the total number of discrete components, and their overall weight and power consumption, may be minimized while preserving the self-sufficiency and autonomy of the module. The power source 205 represents a power system, which may include one or more batteries, a voltage regulator, and a power distribution network.

The communication system 210 may include one or more optical transceivers. For example, the communication system 210 may include multiple pairs of IR sensors and emitters. Such transceivers may double as a directional guiding mechanism for both inter-robot and intra-robot docking. Moreover, the communication system 210 may include longer-range communication devices such as radio transceivers and/or radar systems.

The actuators 220 may be commercial-off-the-shelf servos for radio-controlled devices (RC servos). For example, the actuators 220 may be Cirrus CS-21 RC servos, provided by Multiplex USA of San Fernando, Calif.. Alternatively, the actuators may be more extensive locomotion systems, including legs, wheels and/or tracks.

The control system 225 may include a low-power microprocessor, which executes programs, performs data manipulations and controls tasks in the robot module 200. The control system 225 may include multiple processing units and may be housed in a single chip or in multiple chips using one or more printed circuit boards (PCBs). For example, the control system 225 may be a central processing unit (CPU) with an arithmetic logic unit (ALU) to perform arithmetic and logic operations, a floating-point math unit, a control unit to obtain and execute instructions, and one or more digital signal processors.

The memory 230 may include a non-volatile memory, a volatile memory, and/or a cache memory. Either the memory 230 and/or the I/O system 235 may be integrated into the control system 225.

The I/O system 235 may include an intra-robot module I/O system for the components of the robot module 200. The I/O system may include I/O ports, additional communication components, and/or sensors. The additional communication components may include an antenna and/or a GPS (Global Positioning System) receiver. The sensors may include chemical sensors, microphones, and/or cameras (e.g., a CMOS (Complimentary Metal Oxide Semiconductor) camera).

Moreover, one or more I/O ports may be provided, such as communication ports or non-communication ports. An example communication port is a generic port provided to allow the robot module 200 to connect to (i.e., piggy-back) additional communication and sensor devices, such as described above, for specialized tasks. An example non-communication port is a power port that would allow sharing of power between robot modules.

Figure 5:
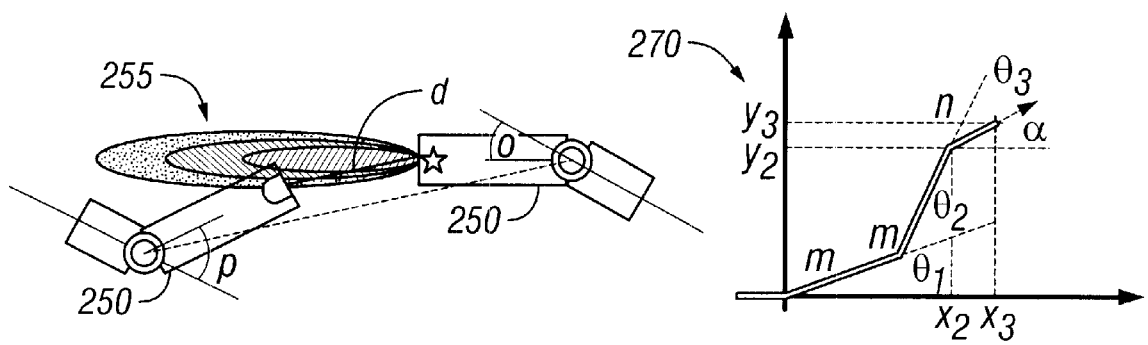
FIG. 5 illustrates an example technique for docking robot modules.

FIG. 5 illustrates an example technique for docking robot modules. Two connectable robot modules 250 are in close proximity; o and p are the orientation angles of the two modules 250, d the distance between them, and the dashed line indicates the desired alignment. An IR lobe 255 may not be ideal given an IR emitter. Thus the lobe 255 may not point to the correct direction and/or have a smooth gradient field with a single maximum peak. To make a successful docking, the lobe of the signal should be tuned and the docking control protocol should take the uncertainty of the lobe shape into consideration. Furthermore, to facilitate achievement of a global optimal alignment, both docking modules 250 may adjust their orientations collaboratively.

The docking process may have three basic stages: (1) the docking modules move close enough so that they can sense each other's docking guidance signals; (2) the docking modules use the docking guidance signals to maneuver their locations and orientations so that their connectors are aligned and close to each other; and (3) the docking modules push their connectors into each other. The two docking modules may be free-floating (e.g., attached to different self-reconfigurable robots) or non-free-floating (e.g., attached to the same self-reconfigurable robot).

In the later case, movement of the modules may be related and can influence each other. Thus, all three stages may involve many modules in addition to the two to be docked in the configuration. In the following discussion of the three stages, communication between modules is subject to the constraint that modules can only talk to their immediate neighbors. Thus, a message from the head of a snake robot to the tail module must relay through all modules in the body. This communication constraint may favor a distributed control process over a centralized control process.

To bring two modules close enough for docking, it may be assumed that the two docking modules are connected through a chain of modules in a current configuration, and this chain is long enough so that it can bend to allow the two docking modules to sense and touch each other. If a robot configuration is viewed as a graph with modules as nodes and connections as edges, then the docking chain is the shortest path in the graph between the two docking module nodes. Additional details regarding this first stage of docking are described further below.

In self-reconfigurable robots, the movements of two docking modules may be constrained by the current robot configuration, and thus both sides of the docking may need to adjust their orientations (o and p) to achieve the desired alignment. Various search strategies may be used to collaboratively adjust the orientations of the two docking modules. For example, the two modules may engage in a leader-follower relationship and adjust their orientations jointly in a hill-climbing search for the maximum measurement of guidance signals. Whenever the leader module, which could be chosen arbitrarily, rotates to an orientation o, it can ask the follower module to perform a scan and find/report an orientation p for the follower that gives the best guidance signal measurement $m_{op}$.

The value p and $m_{op}$ indicate the appropriateness of the leader's orientation o in the context of aligning with the follower. In the following description, the above procedure can be called "find the best alignment for the follower" (FBAF) and the procedure FBAF(o) can be assumed to return a pair of values (p, $m_{op}$). The notation (o, (p, $m_{op}$)), where $(p, m_{op})$=FBAF(o), can be used to represent a joint alignment (o, p) and its appropriateness $m_{op}$. Using these measurements, the leader can decide to which direction it should move its orientation in order to perform an effective search for the best alignment. These measurements can also be used to decide when the alignment process can be determined.

To decide the direction for orientation search, the leader first evaluates two consecutive joint alignments (o, (p, $m_{op}$)) and (o', (p', $m'_{op}$)), where o'=o+Δ. The value of Δ represents the size of increment in orientation change, and the sign of Δ represents the direction of orientation change. If $m'_{op}$>$m_{op}$, then the leader selects Δ as its search direction. If $m'_{op}$<$m_{op}$, the leader selects Δ=Δ as its search direction. If $m'_{op}$=$m_{op}$, the leader repeats the above process until $m'_{op}$≠$m_{op}$.

Once the direction of orientation search is determined, the above procedure can be used for the leader to find the best alignment by hill-climbing. Let (o, (p,$m_{op}$)) be the current alignment. The leader increments its rotation o'=o+Δ and obtains (p',$m'_{op}$) for o' from the follower. If $m'_{op}$≧$m_{op}$, which indicates that o' gives a better or equal alignment than o, then the leader sets o=o', p=p', $m_{op}$=$m'_{op}$, and continues the research. If $m'_{op}$<$m_{op}$, which indicates a decrease in the quality of alignments, then the leader determines the search and declares (o,p,$m_{op}$) as the best alignment for the current distance.

Once the best alignment has been found, the two docking modules must move towards each other in the trajectory specified by the alignment. This will reduce the distance between the two modules and increase the value of $m_{op}$. Since the movements in self-reconfigurable modules can be noisy and uncertain, a new alignment may be performed after the distance is reduced. This alignment-then-move-closer action can be repeated until the value of $m_{op}$ is above a threshold. This indicates that the two connectors are aligned and close enough, and the final pushing stage can begin.

The final pushing stage involves pushing the two modules toward each other in the trajectory specified by the alignment. Such movements, which are also used to reduce the distance between docking modules during alignment, may involve coordinated actions of multiple modules using inverse kinematics. Such coordinated movements can provide the necessary pushing force for the final docking stage. Since the movement should follow the trajectory, the distance of the movement should be small enough that a smooth movement may be assumed. The computation of inverse kinematics can be distributed among modules, as is described further below.

The final pushing should also be strong enough to overcome any friction associated with the connectors of the two modules. This friction can be a significant obstacle in self-reconfigurable robot because the strengths of modules' motors may be limited. To overcome this problem, a technique of dynamic lubrication may be used. During the latching and locking stage, the two docking modules may perform high-frequency small shaking movements while pushing forward. Such movements can significantly reduce the friction during docking and ensure that the docking connectors securely latch together.

One action that is frequently used in docking is to move a docking module on a given trajectory. For example, after two docking modules are aligned, they move along their tip directions respectively to reduce the distance between them. Similarly, such movement is also used to push the docking connectors together.

To generate such actions, a chain of modules immediately connected to the docking module may coordinate their movement using inverse kinematics. This is similar to the classic robotics problem of controlling a robot arm to put a peg into a hole. The difference is that each module in a reconfigurable robot is an independent and autonomous system, while in classic robotics applications all motors and sensors are controlled by a single computer.

To distribute the computation for inverse kinematics among reconfigurable modules, consider a three-module chain 270 as illustrated in FIG. 5. Given the current angles of each module $\theta_1$, $\theta_2$, and $\theta_3$, and the lengths of the relevant segments m and n, we can compute the tip position ($x_3$, $y_3$) using forward kinematics as follows:

(1) $x_3 = m\ Cos(\theta_1) + m\ Cos(\theta_1+\theta_2) + n\ Cos(\theta_1+\theta_2+\theta_3)$ (2) $y_3 = m\ Sin(\theta_1) + m\ Sin(\theta_1+\theta_2) + n\ Sin(\theta_1+\theta_2+\theta_3)$ (3) $\alpha = \theta_1 + \theta_2 + \theta_3$ Assume the tip is to be moved along the a direction by a distance δ, then the new tip position (x'3, y'3), the new middle position (x'2, y'2), and the new module angles θ'1, θ'2, and θ'3, can be computed as follows:

(4) $x'_3 = x_3 + \delta\ Cos(\alpha)$ (5) $y'_3 = y_3 + \delta\ Sin(\alpha)$ (6) $x'_2 = x'_3 - n\ Cos(\alpha)$ (7) $y'_2 = y'_3 - n\ Sin(\alpha)$ (8) $W = a\ tan(y'_2/x'_2)$ (9) $\theta'_1 = W + a\ cos[x'_2/2m\ Cos(W)]$

(10) $\theta'_2 = 2W - 2\theta'_1$

(11) $\theta'_3 = \alpha - (\theta'_1 + \theta'_2)$

Let the three modules from the origin to the tip of the chain be named as M1, M2, and M3, then under the constraints that modules can only communicate with their immediate neighbors, the above computation can be distributed among the three modules as follows:

M1 computes $A = m\ Cos(\theta_1)$ and $B = m\ Sin(\theta_1)$ and sends $[A, B, \theta_1]$ to M2;

M2 computes $\phi = \theta_1 + \theta_2$, $C = A + m\ Cos(\phi)$ and $D = B + m\ Sin(\phi)$ and sends $[\phi, C, D]$ to M3;

M3 computes (1) to (7) and sends $[x'_2, y'_2]$ to M2;

M2 computes (8) and sends $[W, x'_2]$ to M1;

M1 computes $\theta'_1$ by (9) and sends $[\theta'1]$ to M2;

M2 computes $\theta'_2$ by (10) and sends $[\theta'_1 + \theta'_2]$ to M3;

M3 computes $\theta'3$ by (11).

This example illustrates that by sending intermediate results to neighbor modules, a chain of modules can compute the inverse kinematics in a distributed fashion. This style of computation is both desirable and sometimes necessary for self-reconfigurable robots because no single module may be assumed always available as the control center and every module is independent, autonomous, and may have very limited on-board computation resource.

Figure 6:
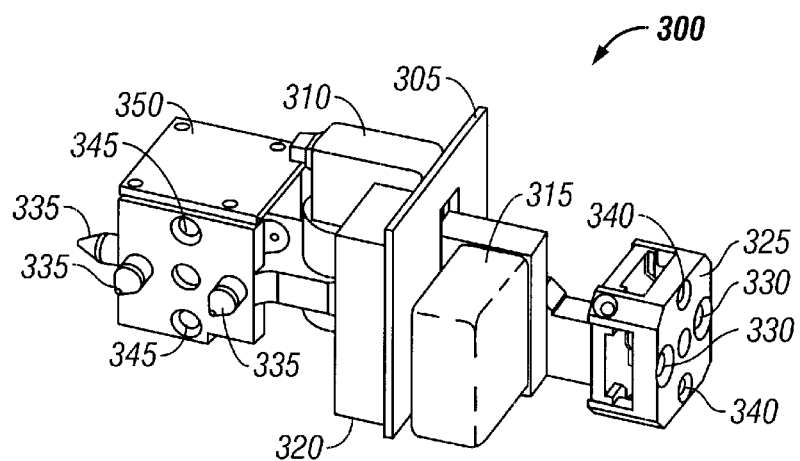
FIG. 6 shows an example robot module.

FIG. 6 shows an example robot module 300. The robot module 300 may be four inches long and have a one square inch cross-section. The robot module 300 includes a control system 305, two motors 310, 315, a housing body 320 (e.g., a delrin frame), and a power source (e.g., batteries). The two motors 310, 315 may be a yaw servo motor 310 and a pitch servo motor 315. The power source may be located inside a first end 350 of the robot module 300, which may have a tongue that is on a fork of the housing body 320. The power source may include a six-volt lithium battery of type K28L and a three-volt K58L cell. Use of two batteries together may prevent large voltage drops at the control system 305 when module components with large power requirements are used.

The control system 305 may include an I/O port, and the control system 305 may be built on a PCB. The control system 305 may include a zero-insertion force socket to allow for manual removal of a processor for replacement or programming. Thus, one of various processors may be selected based on a current application. The control system 305 may include a micro-controller, such as a STAMP II micro-controller, provided by Parallax Inc. of Rocklin, Calif. The STAMP II has 2 Kilobytes of ROM (Read Only Memory) for programs and 32 bytes of RAM (Random Access Memory) for variables.

The first end 350 includes three passive connectors located on three sides of the module, called front, left, and right. The passive connectors include docking pins, such as pins 335. A second end 325 of the module 300 includes an active connector, called the back. The active connector includes sockets 330 to accept another module's docking pins. The active connector may be attached to an arm, which attaches to the housing 320. The active connector may have a default or non-active state for mechanically latching to a passive connector (e.g., a spring-loaded latch for locking the pins), and an active state for releasing a passive connector (e.g., a Shape Memory Allow (SMA) triggered mechanism for releasing the pins).

Figure 7A:
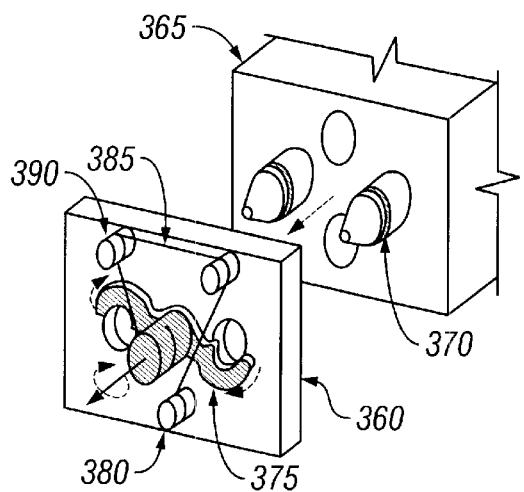
FIG. 7 shows example connectors for a robot module.
Figure 7B:
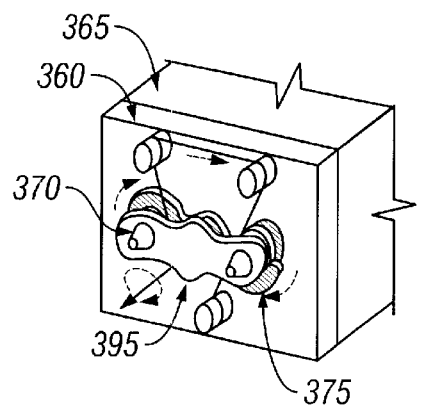

FIG. 7 shows example connectors for a robot module. An active connector 360 may couple with a passive connector 365. The passive connector 365 may include a delrin frame and may include two aluminum pins 370 that fit into sockets on the active connector 360. The pins 370 may be cylindrical and may include a lateral groove to allow the active connector 360 to anchor to the passive connector 365.

The active connector 360 engages and disengages the pins 370 and may include a delrin frame. The pins 370 may include dome-shaped heads such that, as the pins slide inside the sockets of the active connector 360, the pin heads force an engagement latch 375 to rotate in a direction normal to the trajectory of the pins 370. When the pins are fully inserted, the engagement latch 375 may be forced by a spring action into the lateral grooves. Thus, the latching of the active connector to the passive connector in the docking process may be completely mechanical.

Disconnecting the two connectors may be initiated by rotating the engagement latch 375 using a wire 385. The wire 385 may be a shape-memory alloy (SMA) wire attached between a fixed binding post 380 and a cylinder portion of the latch 375. One or more rollers, such as a roller 390, may be used to establish the path of the SMA wire 385 and to extend its working length. When a current is applied to the SMA wire 385, the wire contracts, rotating the latch 375 and freeing the pins 370.

Use of an SMA wire provides a large change in length for the wire, which can be useful in constructing small latching mechanisms. However, an SMA wire can consume a large amount of power. Thus, to help in reducing an amount of time that the SMA wire is contracted, a disengagement latch 395 may be included. The disengagement latch 395 is a plate with two holes through which the heads of the pins 370 pass. When the wire 385 rotates the engagement latch 375 to release the pins 370, the wire 385 also rotates the disengagement latch 395 to push the heads of the pins 370 far enough out of the sockets to prevent re-engagement of the pins 370 when the engagement latch 375 returns to its original position. This type of disengagement mechanism may be used with engagement mechanisms other than those using SMA wires. Moreover, other latching mechanisms are also possible.

Referring again to FIG. 6, the robot module 300 also includes a communication interface for each connector. A passive connector may include an infrared (IR) transceiver 345 (e.g., an IR emitter and an IR sensor), and the first end 350 may hold wiring and/or electronics for the IR transceiver. For example, the top of the first end 350 may be a two-layer PCB having I/O electronics to drive the IR transceiver; such a PCB may also double as a positive contact for a battery. The active connector also includes an IR transceiver 340 (e.g., an IR emitter and an IR sensor). When a passive connector and an active connector are joined together, the connection is called an active link, which is a bi-directional local communication link. The connected modules are called neighbors.

A communication protocol (e.g., an Adaptive Communication protocol) between modules may be built on top of a low level communication initiation protocol. Such an initiation protocol may involve a handshake routine between a sender and a receiver to check for and establish an active link. For example, when the sender wants to send a message, it may turn on its infrared transmitter and wait for the receiver to respond. When the receiver detects the signal, it may turn on its transmitter to inform the sender of its presence, and both sender and receiver may then enter a serial communication protocol (e.g., RS232 with 9600 baud rate). Message can then be sent and received. If there is no receiver at the other end, then the sender does not get a response and the send( ) procedure returns a time out failure.

An IR transceiver also may be used for docking guidance. As discussed above, two IR transceivers may be used as docking proximity sensors for guiding two modules together during a reconfiguration action. Thus, the robot module 300 may connect and disconnect with other similar modules to form various self-reconfigurable robots. The module 300 is an autonomous and self-sufficient system, and a self-reconfigurable robot built with such connected modules is a dynamic communication network of autonomous systems.

Figure 8:
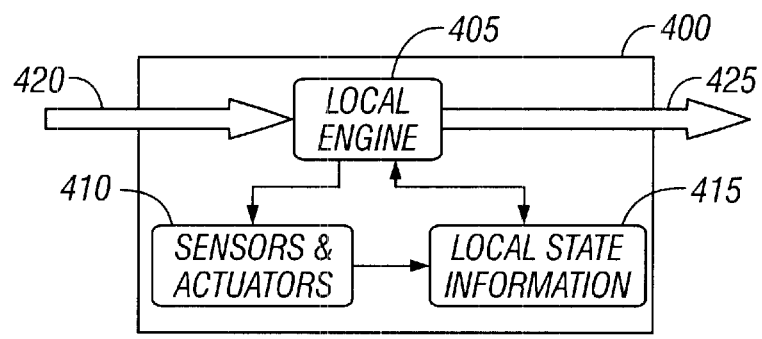
FIG. 8 is a block diagram illustrating components of and communications with a robot module.
Figure 9:
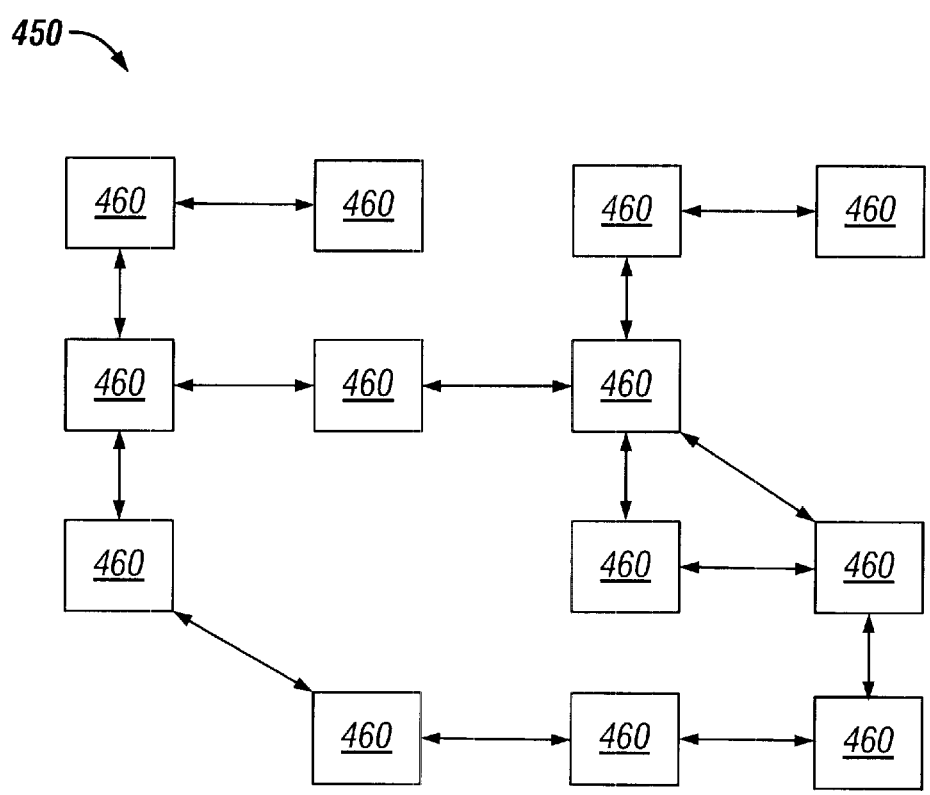
FIG. 9 is a block diagram illustrating a self-reconfigurable robotic system.

FIG. 8 is a block diagram illustrating components of and communications with a robot module 400. FIG. 9 is a block diagram illustrating a self-reconfigurable robotic system 450. The robotic system 450 includes multiple robot modules 460, which may be connectable or non-connectable modules as described above. These robot modules 460 may be constructed with varying degrees of homogeneity, but may be generally represented by the module 400 from FIG. 8.

A current set of communication connections between modules of a self-reconfigurable robotic system represents a current network topology for the robotic system. Thus, the network topology provides information about current system capabilities. In a physically connected robot example, the network topology may correspond to the physical configuration of the robot, and thus the network may inherently represent physical capabilities of the robot. In a non-connected robotic system example, the network topology may correspond to robot densities over an area, and certain tasks may require a certain number of robots in a team. Thus, the network may inherently represent functional capabilities of the robotic system.

The modules of the self-reconfigurable robotic system form a dynamic communication network in which nodes can arbitrarily change their communication links with other nodes. Communication among the autonomous modules may be adaptive to topological changes in the network, including unexpected changes, such as a leg suddenly being cut off. Moreover, the autonomous modules may collaborate to accomplish group tasks, including synchronization of individual actions in order to accomplish desired global effects, such as reconfiguration, locomotion, navigation and manipulation.

The robotic system 450 may use an adaptive communication and distributed control system to handle changing network topology. Distributed control of the system 450 may increase fault tolerance and versatility of the system overall. The adaptive communication and distributed control system described below is inspired by hormones found in biological systems. Thus the messages used for distributed control are frequently referred to as hormones.

Similar to a biological system, a hormone is a control message that travels among modules in one or more robots, triggering and coordinating their actions to accomplish complex tasks. A hormone need not have a specific destination module, and thus modules that use hormones need not have specific addresses or identifiers. Different types of hormones serve different purposes, triggering modules with different local topologies (given a current configuration) to perform different actions. Hormones may be used for distributed robot control in a robotic system, and hormones may also serve as a synchronization signal between modules in a reconfigurable robot in order to produce a desirable global result.

Upon receiving a hormone, a module may combine an action code in the hormone with the role of the module in the current robotic system configuration, and the module may then use this information as an index to retrieve an appropriate action from reaction tables stored in the module. The module may then execute a retrieved action, such as use sensors and/or actuators, and/or modify the hormone's action code and/or progress bits, etc., and pass the possibly modified hormone to the next module. A hormone may have a life span, and a hormone may propagate through an entire network of modules, yet cause different modules to react differently based on their local receptors, topology connections, and/or state information.

A module can dynamically discover local topological changes in a dynamic network and adjust its communication strategy accordingly. A common protocol for all modules can be designed so that predetermined hormones propagate to every module in the network once and only once, regardless of changes in network topology (i.e., adaptive communication). Moreover, each module may have a set of hormone receptors implemented as a set of local rules that allow modules to react to hormones based on their local topology information, and select and synchronize their local actions to achieve the desired global results (i.e., distributed control).

A module 400 includes a local decision engine 405 that examines hormone messages 420 received from one or more of the module's communication links, and decides if any local actions should be taken on local devices or on these hormones. Such actions include using local sensors and/or actuators 410, modifying local receptors or programs, generating new hormones 425, or modifying or terminating certain hormones. Two important properties are worth noticing here. First, the module's decisions for actions may be totally dependent on the module's local information and knowledge. Second, since modules may have different local state information 415, a single hormone message may cause different actions at different modules. These two properties of hormones may be used to implement dynamic communication and distributed action cooperation.

All modules 460 in a robotic system may share the same control strategy. This uniformity allows modules 460 to communicate with each other regardless of the changes in the network topology. By providing appropriate hormones and receptors, new configurations can be negotiated and constructed among the modules 460 themselves without interrupting their regular communications. Furthermore, since programming the local decision engine 405 may be a completely local activity, independent of the state of other modules in the organization, this communication mechanism can be scaled up to very large organizations.

Such hormones may also be used to extend or alter the functions of a module's local engine so that the responses to new and old hormones can be dynamically programmed and altered. This ability may allow dynamic changes in the functions of robot modules, in a way that is similar to the biological hormones that can enter the cell nucleus.

Figure 10:
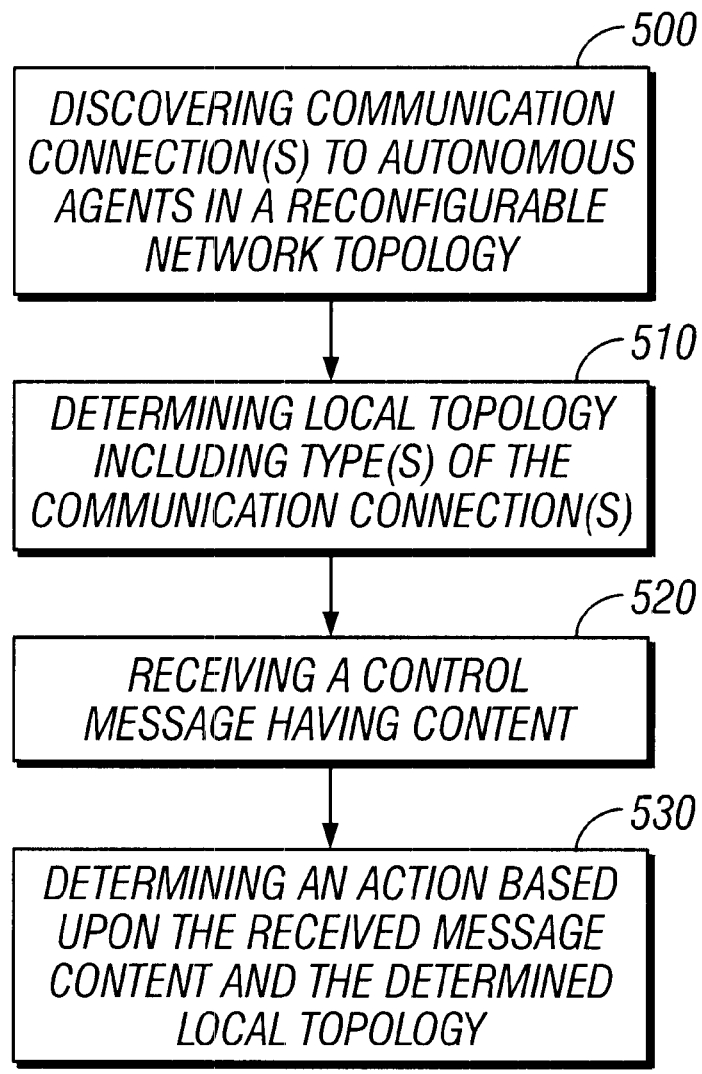
FIG. 10 is a flow chart illustrating a process that may be used in adaptive communication and distributed control in self-reconfigurable robotic systems.

FIG. 10 is a flow chart illustrating a process that may be used in adaptive communication and distributed control in self-reconfigurable robotic systems. One or more communication connections are discovered at 500. These communication connections are with autonomous agents that are communicatively coupled together in a reconfigurable network topology. Then, a local topology including one or more types of the one or more communication connections is determined at 510.

The discovery of communication connections and the determination of local topology may be viewed as a single process of discovering a current local topology. This process of discovery may be repeated between each of a plurality of maneuvers to be performed by a robot module. Thus, the robotic system may continuously discover changes in network topology while its component modules perform actions, such as sending control signals to the one or more actuators, thereby allowing coordination of collective behavior of the modules under changing conditions.

Discovering the local topology may involve first establishing an active communication link with another robot module, such as by initiating a communication handshake protocol on each available communication interface, and then determining mutual communication connection ports used on either side of the an established active communication (i.e., a discovered communication connection).

Determining the communication connection type may involve identifying a first communication port and a second communication port used by a communication connection. Identifying the first and second communication ports may involve identifying orientations of the first and second communication ports with respect to one or more defined references, such as a compass direction or the robot modules on either side of the communication connection. For example, identifying the orientations of the first and second communication ports may involve identifying whether each communication port is a left, right, front or back communication interface on their respective robot modules.

Thus, on each cycle in an autonomous agent, a probe may be sent to discover all current neighbor agents and how those neighbor agents are communicatively connected with the local agent. Repeating this discovery process before performing an action, or deciding to perform no action based upon control message(s), in each cycle allows collaboration with the autonomous agents to effect collective behavior in a dynamically changing network topology.

A control message having content is received at 520. In response to the control message, an action is determined at 530. This action determination may be based upon the received message content and the determined local topology. Determining an action to be performed may involve determining whether to perform a locally selected action or no action, and determining whether to propagate the control message or to not propagate the control message.

Propagation of the control message may involve forwarding the control message from an active in-link (the connection through which the message arrived) to one or more active out-links. Alternatively, propagation may involve changing the control message, and transmitting the changed control message over one or more active out-links. Thus, message propagation differs from a traditional message broadcast. There is no guarantee that every node in the network will receive the same copy of the original message because the message may be modified during its propagation. Additionally, the manner of propagation and/or whether or not to propagate the control message may be based upon the local topology.

Determining an action to be performed may involve generating one or more additional control messages to coordinate collective behavior of the autonomous agents. This generation of additional control message may be based upon a locally selected action, the first control message and the local topology. Still further control messages may be received in response. These various control messages may be propagated through the robotic system to resolve conflicts among actions selected by the autonomous agents. Thus, a locally'selected action (e.g., a maneuver of a robot module) may be performed after it is modified due to a conflict resolution process. Additional details of an example conflict resolution process are described below.

Figure 11:
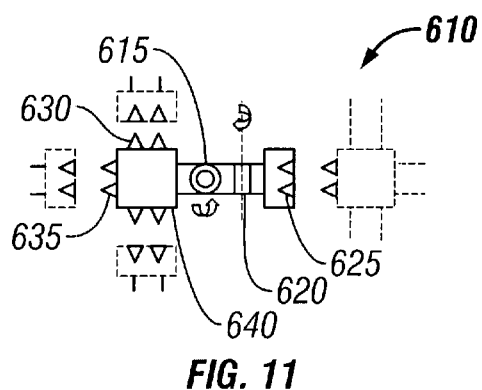
FIG. 11 is a block diagram of an example robot module.

FIG. 11 is a block diagram of an example robot module 610. The robot module 610 includes a first degree of freedom (DOF1) 620 (e.g., pitch) and a second degree of freedom (DOF2) 615 (e.g., yaw). The two degrees of freedom 615, 620 may have home positions (e.g., when the joint is straight), and may have joint limits (e.g., a maximal and a minimal joint angle).

The robot module 610 also includes one active connector 625 and three passive connectors 630, 635 640. FIG. 11 illustrates possible connections for the robot module 610 from a top-down point of view. The active connector 625 may be called back, the passive connector 630 may be called left, the passive connector 635 may be called front, and the passive connector 640 may be called right.

Figure 12:
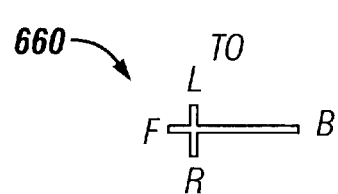
FIG. 12 shows a simple representation of the robot module from FIG. 11.

FIG. 12 shows a simple representation of the robot module from FIG. 11. A robot module 660 has four connectors, back (b), left (l), front (f) and right (r). Table 1 lists thirty-two local topology types for this example robot module.

TABLE 1

| This Module | | | | |
|---|---|---|---|---|
| b | f | r | l | Type |
| Connected to other modules | | | | |
|   |   |   |   | T0 |
| f |   |   |   | T1 |
|   | b |   |   | T2 |
|   |   | b |   | T3 |
|   |   |   | b | T4 |
| l |   |   |   | T5 |
| r |   |   |   | T6 |
|   | b | b |   | T7 |
|   | b |   | b | T8 |
|   |   | b | b | T9 |
| l | b |   |   | T10 |
| l |   | b |   | T11 |
| l |   |   | b | T12 |
| r | b |   |   | T13 |
| r |   | b |   | T14 |
| r |   |   | b | T15 |
| f | b |   |   | T16 |
| f |   | b |   | T17 |
| f |   |   | b | T18 |
|   | b | b | b | T19 |
| f | b | b |   | T20 |

TABLE 1-continued

| This Module | | | | |
|---|---|---|---|---|
| b | f | r | l | Type |
| f |   | b | b | T21 |
| f | b |   | b | T22 |
| l | b | b |   | T23 |
| l | b |   | b | T24 |
| l |   | b | b | T25 |
| r | b |   |   | T26 |
| r |   | b | b | T27 |
| r | b |   | b | T28 |
| f | b | b | b | T29 |
| l | b | b | b | T30 |
| r | b | b | b | T31 |

These local topology types are based on how a robot module is connected to its neighbors. Such topology type information may be used to represent a local topology for an autonomous agent in a dynamic communication network. The module 660 is of type T0 because it has no active links.

Figure 13:
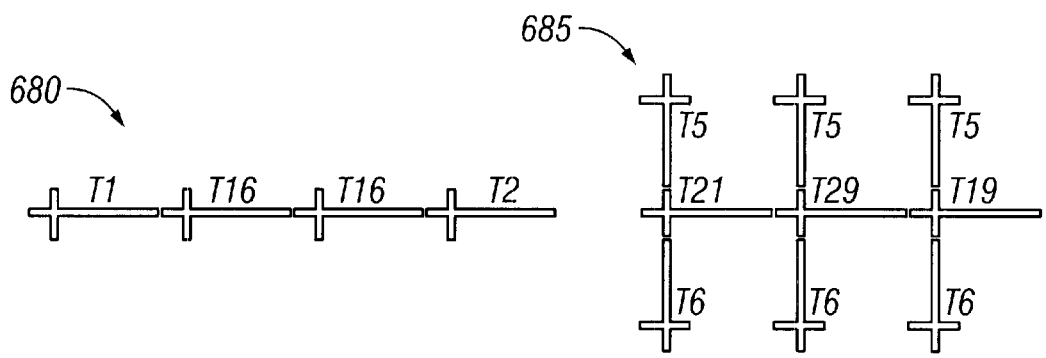
FIG. 13 shows a simple representation of two example configurations for self-reconfigurable robots.

FIG. 13 shows a simple representation of two example configurations for self-reconfigurable robots. A snake robot 680 and a hexapod robot 685 are self-reconfigurable robots constructed from a set of autonomous modules. A module is of type T2 if its front is connected to the back of another module. A module is of type T16 if its back is connected to the front of a neighbor and its front is connected to the back of another neighbor. A module is of type T21 if its back is connected to the front of another module, and its left and right are connected to the backs of other two modules respectively. An active link is a pair of the active connector b and one of the three passive connectors, f, l, and r. The thirty-two types in Table 1 are ordered by the number of active links they have. For example, type T0 has no active links, types T1 through T6 have one active link, types T7 through T18 have two active links, types T19 through T28 have three active links, and types T29 through T31 have four active links.

Based on the description of self-reconfigurable modules above, we can define a self-reconfigurable communication network as a connected, undirected graph that has the following properties: (1) each node is a self-reconfigurable module; (2) each node has finite, named connectors, and two connectors of two modules can join and form an active link but one connector can only be in at most one active link; (3) each edge of the graph is an active link; (4) the topology of the network may change dynamically (i.e., existing active links may disconnect and new active links may appear); (5) nodes communicate through active links; (6) nodes do not have unique IDs and do not know the size of the network.

Pseudo code implementing an adaptive communication protocol may be written as follows:

OUT: the queue of messages to be sent out;
IN: the queue of messages received by a background receiver procedure;
C: the number of connectors for each module;
MaxClock: the max value for the local timer;
LINK[1, . . . ,C]: the variables for the status of the connectors, the initially
    values are nil;
A hormone is a message of [type, data, sc, rc], where sc is the sending
    connector through which the message is sent, and rc is the
    receiving connector through which the message is received
    (this value is filled by the background receiver procedure).

-continued

```
Main()
LocalTimer = 0
Loop forever:
    For each connector c = 1 to C, insert [probe, _,c, _] in OUT;
    For each received hormone [type, data, sc, rc] in IN, do:
        { LINK[rc] = sc;
            If (type ≠ probe) then
                SelectAndExecuteLocalActions(type, data);
                PropagateHormone(type, data, sc, rc); }
    Send();
    LocalTimer = mod(LocalTimer + 1, MaxClock);
End Loop.
SelectAndExecuteLocalActions(type, data)
{If LocalTimer = 0, then for c = 1 to C, do:
    Insert [Test, 0, c, nil] into OUT;
//Other possible local actions introduced later. }
PropagateHormone(type, data, sc, rc)
    {For each connector c = 1 to C, do:
        IfLINK[c] ≠ 0 and c ≠ rc, then
            {Delete [probe, *, c, *] from OUT;
                Insert [type, data, c, nil] into OUT; // propagation }
}
Send()
{For each connector c = 1 to C, do:
    get the first message [type, *, c, *] from OUT,
    Send the message through the connector c;
    If send fails (i.e., time out), LINK[c] = 0.
}
```

Robot modules in a communication network may use this Adaptive Communication (AC) protocol to handle topological changes in the network. For example, each module may run the same AC protocol so that local network topology is rediscovered before each discrete action to be taken.

The main procedure is a loop of receiving and sending (propagating) control messages (called hormone messages) between neighbors, and selecting and executing local actions based on these messages. With this protocol, every module is able to detect changes in its local topology through its active links. The modules send probe messages to their connectors to discover if the connectors are active or not. The results of this discovery, the received probe messages, are maintained in a vector variable LINK[C], where C is the number of connectors for each module (e.g., C=4).

For the purposes of this discussion, the procedure called 'SelectAndExecuteLocalActions' includes only a trivial local action. When LocalTimer=0, a module will generate a test hormone to propagate to the network. Other possible local actions are introduced below.

If there is no active link on a connector c (or an existing active link on c is disconnected), then sending of a probe to c will fail and LINK[c] will be set to nil. If a new active link is just created through a connector c, then sending a probe to c will be successful and LINK[c] will be updated. After one exchange of probes between two neighbors, both sides will know which connector is involved in the new active link and their LINK variables will be set correctly. For example, if an active link is created between the connector x of module A and the connector y of module B, then LINK[x]=y for module A, and LINK[y]=x for module B. Biologically speaking, the probe messages are analogous to the chemical signals released by a cell to its neighboring space.

The LINK[C] variable can represent the local topology types of modules described in Table 1. For example, a module is type T0 if LINK[f,l,r,b]=[nil,nil,nil,nil]; type T2 if LINK[f,l,r,b]=[b,nil,nil,nil]; and type T21 if LINK[f,l,r,b]= [nil,b,b,f].

This AC protocol has a number of important properties. First, using the AC protocol, all modules can adapt to the dynamic topological changes in the self-reconfigurable network and discover their local topology in a time less than two cycles of the main loop. The updated local topology information is stored in LINK[c]. Initially all LINK variables have a nil value. If a module has a neighbor on its connector c, then LINK[c] will be set properly when this module receives a probe on that connector. Since every module probes all its connectors in every cycle of the program, the LINK[c] will be updated correctly with at most two cycles.

Second, if the network is an acyclic graph, then the AC protocol guarantees that every hormone message, excluding probe messages, will be propagated to every module in the network once and only once. When a new hormone is generated in a module (e.g., [Test,*,*,*] in the pseudo code above), the new hormone is sent to all active links from that module. When a module receives a hormone, the module sends the hormone to all active links except the link from which the hormone is received. Since the network is acyclic, the generator module can be viewed as the root of a propagation tree, where each module will receive the hormone from its parent, and will send the hormone to all its children. The propagation terminates at the leaf nodes of this propagation tree. The leaf nodes are the modules with no active links other than the one on which the hormone is received. Since the tree includes every module, the hormone reaches every module. Since every module in the propagation tree has only one parent, the hormone will be received only once by any module.

For networks that contain loops (i.e., the network is a cyclic graph), the AC protocol may be augmented to include a check of additional local information (other than the topological types) to break the loop of communication. An example of this augmentation is described below in connection with control of rolling tracks.

The above-described AC protocol may be extended to implement a distributed control mechanism for modules in a self-reconfigurable robotic system. This distributed control mechanism may allow robot modules to collaborate and synchronize their actions to accomplish group tasks, such as reconfiguration, locomotion, navigation and manipulation.

Figure 14:
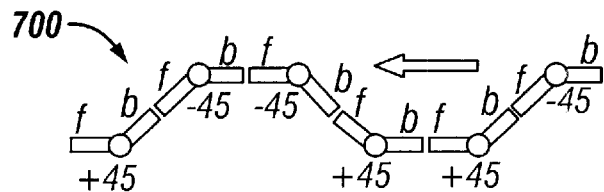
FIG. 14 shows an example six-module metamorphic snake robot.

FIG. 14 shows an example six-module metamorphic snake robot 700. The snake robot 700 may be made to travel using an Adaptive and Distributed Control (ADC) protocol to effect a caterpillar gait. The types of modules, from the left to the right, in this robot are: T1 (the head), T16, T16, T16, T16, and T2 (the tail). To move forward, each module's pitch motor (DOF1) goes through a series of positions and the synchronized global effect of these local motions is a forward movement of the whole caterpillar (indicated by the arrow).

To completely specify this gait, one can use a conventional gait control table as shown in Table 2.

TABLE 2

| | Module ID for DOF1 actions | | | | | |
|---|---|---|---|---|---|---|
| Step | M1 | M2 | M3 | M4 | M5 | M6 |
| 0 | +45° | −45° | −45° | +45° | +45° | −45° |
| 1 | −45° | −45° | +45° | +45° | −45° | −45° |
| 2 | −45° | +45° | +45° | −45° | −45° | +45° |
| 3 | +45° | +45° | −45° | −45° | +45° | +45° |

Each row in Table 2 corresponds to the target positions for all modules in the snake configuration 700 during a step. Each column corresponds to the sequence of target positions for one module. As can be seen in Table 2, the six columns correspond to the six module's DOF1 in FIG. 14 (the leftmost is M1, and the rightmost is M6). The first row in Table 2 corresponds to the state of the robot 700 shown in FIG. 14.

To implement a caterpillar gait using the ADC protocol, the shifting pattern among the actions performed by the modules, as illustrated by Table 2, is incorporated into the protocol. The action performed by a module M at step T is the action to be performed by the module (M−1) at step (T+1). Thus, instead of maintaining the entire control table, the caterpillar gait is represented and distributed at each module as a sequence of motor actions (+45°, −45°, −45°, +45°). If a module is performing this caterpillar gait, it selects and executes one of these actions in a way that is synchronized and consistent with its neighbor module. To coordinate the actions among modules, a control message can be propagated through the snake. Each module uses the propagating control message to inform its immediate neighbor what action it has selected so the neighbor can select the appropriate action and continue the control message propagation.

This hormone-inspired distributed approach to controlling the snake robot 700 is independent of the length of the snake. Thus, two snake robots can join together, or one snake robot can split in two, without the motion control mechanism changing. This type of control mechanism may provide additional benefits, such as when moving on rough ground, or when reconfiguring the robot. For example, the same control protocol can be used during splitting of a snake robot by originating a move hormone message at a module in the middle of a snake robot once that module has unlatched from its neighbor.

An ADC protocol for a current robot configuration causes each module in the robot configuration to react to received hormones with appropriate local actions. These actions may include commands to local sensors and actuators, updates of local state variables, as well as modification of existing hormones or generation of new hormones. Modules determine their actions based on the received hormone messages, their local knowledge and information, such as neighborhood topology (e.g., module types) or the states of local sensors and actuators.

Additional pseudo code can be added to the pseudo code above as follows:

SelectAndExecuteLocalActions(type, data)

{// Select appropriate actions based on

// type, data, LINK, LocalTimer, and RULEBASE;

Actions SelectActions(type,data,LINK,LocalTimer, RULEBASE);

For each action a in Actions, do ExecuteAction(a);

}
RULEBASE:

{// The rules here are similar to the receptors in biological cells.

// They are task-specific "if-then" rules as those in Table 3;

// Although each desired task has a different set of rules,

// the rules can be combined together if they are not conflicting.

}

This pseudo code implements an ADC protocol for the i snake robot 700. The ADC protocol includes a RULEBASE and A extends the procedure SelectAndExecuteLocalActions( ) to select If and execute actions based on rules in the RULEBASE. The selection process is based on local topology information, such as LINK[] and the module type, as well as local state information, such as local timer, motor and sensor states. Biologically speaking, the rules in RULEBASE are analogous to the receptors in biological cells, which determine when and how to react to incoming hormones.

Table 3 shows a rulebase for an example global behavior of caterpillar movement.

TABLE 3

| Module Type | Local Timer | Received Hormone Data | Perform Action | Send Hormone |
|---|---|---|---|---|
| T1 | 0 | | DOF1 =+ 45 | [CP, (+45, +45 , b] |
| T1 | 1/4* MaxClock | | DOF1 = −45 | [CP, (+45, −45 , b] |
| T1 | (1/2* MaxClock | | DOF1 = −45 | [CP, (−45, −45 , b] |
| T1 | (3/4)* MaxClock | | DOF1 = +45 | [CP, (−45, +45), b] |
| T16,T2 | | (+45, +45) | DOF1 = −45 | [CP, (+45, −45), b] |
| T16,T2 | | (+45, −45) | DOF1 = −45 | [CP, (−45 , −45), b] |
| T16,T2 | | (−45, −45) | DOF1 = +45 | [CP, (−45, +45), b] |
| T16,T2 | | (−45, +45) | DOF1 = +45 | [CP, (30 45, +45, b] |

In Table 3, the type of the hormone message is called CP, and the data field contains the last and current values for DOF1. The other fields of hormones are as usual, but only the field of sender connector (sc) is shown for simplicity of description.

All modules in the robot may have the same set of rules, but they can react to hormones differently because each module has different type and local state information. For example, the first four rules trigger the head module (type T1) to generate and send (through the back connector b) four new hormones in every cycle of MaxClock, but have no effects on other modules. The last four rules do not affect the head module, but cause the body modules (T16) to propagate hormones and select actions. These modules receive hormones through the front connector f and propagate hormones through the back connector b. When a hormone reaches the tail module (T2), the propagation stops because the tail module's back connector is not active. The speed of the caterpillar movement can be determined by the value of MaxClock. A smaller value leads to more frequently generated hormones, and thus a faster caterpillar movement.

A module may become the generator of a hormone sequence in two ways. The module can be either self-promoted or instructed. In the self-promoted case, a local sensor routine might be triggered by an external stimulus or a current hormone management routine might trigger another hormone management routine. In response to the trigger, the routine may assign a value to a local variable to indicate which hormone sequence is currently being generated. In the instructed case, a module assigns a value to this local variable because it is instructed to do so by a special hormone trigger message. Similarly, a module stops producing hormones if this local variable is set to nil, either by self-promotion or by an external instruction.

The ADC protocol has a number of advantages. First, it supports online reconfiguration and is robust in handling configuration changes. For example, when a snake is cut into two segments, the two disconnected modules will quickly change their types from T16 to T1, and from T16 to T2, respectively (due to the AC protocol). The new T1 module will serve as the head of the first segment, and the new T2 module will become the tail of the second segment. Both segments will continue to move as a caterpillar. Similarly, when two or more snakes are concatenated together, all the modules that are connected will become T16, and the new snake will have one head and one tail, and the caterpillar move will continue with the long snake. Other advantages of this hormone-inspired distributed control protocol include scalability, for the control can function regardless of how many modules are in the snake configuration, and the efficiency of communication, for the coordination between modules may require only one hormone to propagate from the head to the tail. Let n be the number of modules in the snake, then the ADC protocol may require only O(n) message hops for each caterpillar step, while a centralized approach would require O(n2) message hops, since n messages must be sent to n modules.

In general, the ADC protocol may provide a variety of benefits. The ADC protocol may be distributed (e.g., no predefined control module) and fault-tolerant (e.g., damage to single modules may not paralyze the entire system). The ADC protocol may support global collaborative behaviors, such as locomotion and self-reconfiguration, without requiring modules to have unique identifiers, since modules can determine their behaviors based on their topology types and/or other local information. The ADC protocol may provide coordination and synchronization without a need for real-time clocks. The ADC protocol may provide a robust and scalable control mechanism in a reconfigurable robotic system.

The ADC protocol can be applied to many different robot configurations using different sets of rules. Table 4 shows a rulebase for an example global behavior of walking in a legged robot.

TABLE 4

| Module Type | Local Timer | Received Hormone Data | Perform Action | Send Hormone |
| --- | --- | --- | --- | --- |
| T21,T17,T18,T1 | 0 | | Straight | [LG, odd, {l, r, b}] |
| T21,T17,T18,T1 | (1/2)* MaxClock | | Straight | [LG, even, {l, r, b}] |
| T29,T19,T26,T28 | | odd | Straight | [LG, even, {l, r, b}] |
| T29,T19,T26,T28 | | even | Straight | [LG, odd, {l, r, b}] |
| T16 | | even | Straight | [LG, even, {b}] |
| T16 | | odd | Straight | [LG,odd, {b}] |
| T5 | | odd | Swing | |
| T6 | | even | Holding | |

In this class of configuration, the module types are similar to the hexapod robot 685 shown in FIG. 13. In other words, the left leg modules are T5, the right leg modules are T6, the head is T21, the tail T19, and the modules in the body are T29. The hormone message used in Table 4 is named as LG. Set notation such as {l,b,r} may be used as shorthand for the set of connectors to send the hormone. The action Straight means DOF1=DOF2=0. The action Swing means to lift a leg module, swing the module forward, and then put the module down on the ground. The action Holding means to hold a leg module on the ground while rotating the hip to compensate the swing actions of other legs.

The first two rules indicate that the head module, which is type T21, T17, T18 or T1, is to generate two new LG hormones with alternative data (odd and even) for every cycle of MaxClock. This hormone propagates through the body modules (T29, T26, or T28) and the tail module (T19), alternates its data field, and reaches the leg modules, which will determine their actions based on their own types (T5 or T6). If a body module is T16 (i.e., does not have legs), then it will simply pass the hormone without alternating the data field.

This control mechanism robustly handles changes in configurations. For example, one can dynamically add or delete legs from this robot, and the control will be intact. The speed of this gait can be controlled by the value of MaxClock, which determines the frequency of hormone generation from the head module.

Figure 15:
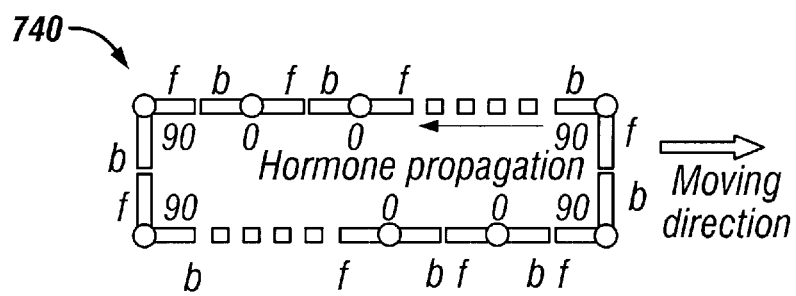
FIG. 15 shows a rolling track robot configuration.

FIG. 15 shows a rolling track robot configuration 740. In this configuration, all modules are of type T16, only their DOF1 values are different. The track moves one direction by shifting the two DOF1 values (90, 90) to the opposite direction.

Table 5 shows a rulebase for a rolling track robot.

TABLE 5

| Module Type | Local Variables | Received CPI Data | Perform Action | Send Hormone |
| --- | --- | --- | --- | --- |
| T16 | Head = 1 Timer = MaxClock | | DOF1 = 90, Timer = 0, Head = 0 | [RL,(90,90,1),b] |
| T16 | DOF1 = 0 | (90,90,1) | DOF1 = 90, Timer = 0, Head = 1 | [RL,(90,0,0),b]* |
| T16 | DOF1 = 0 | (90,90,0) | DOF1 = 90, Timer = 0, Head = 0 | [RL,(90,0,0),b] |
| T16 | DOF1 = 0 | (90,0,0) | DOF1 = 0, Timer = 0, Head = 0 | [RL,(0,0,0),b] |
| T16 | DOF1 = 0 | (0,0,0) | DOF1 = 0, Timer = 0, Head = 0 | [RL,(0,0,0),b] |
| T16 | DOF1 = 90 | (0,0,0) | DOF1 = 0, Timer = 0, Head = 0 | [RL,(0,90,0),b] |
| T16 | Head = 0, DOF1 = 90 | (0,90,0) | DOF1 = 90, Timer = 0, Head = 0 | [RL,(90,90,0),b] |
| T16 | Head = 0, DOF1 = 90 | (0,90,0) | DOF1 = 90, Timer = 0, Head = 0 | [RL,(90,90,1),b] |

Note:
*means send the hormone after all local actions are completed.

The hormone used here is of type RL, and its data field contains two values of DOF1, and a binary value for selecting the head module. One hormone message continuously propagates in the loop (just as a token traveling in a token ring) and triggers the modules to bend (DOF1=90) or straighten (DOF1=0) in sequence. It can be assumed that there is one and only one module whose local variable Head=1. This module is responsible for generating a new hormone when there is no hormone in the loop. This is implemented by the first rule, which will detect a time-out for not receiving any hormone for a long time (i.e., looping through the program for MaxClock times). The head module is not fixed but moving in the loop. It can also be assumed that the initial bending pattern of the loop is correct (e.g., as shown in FIG. 15) and the head module is initially located at the up-right corner of the loop. The rules in Table 5 shift the bending pattern and the head position in the loop and cause the loop to roll in the opposite direction of hormone propagation. Since hormone propagation is much faster than the actual execution of actions, when a module is becoming the head, it is also responsible for making sure all actions in the loop are completed before the next round starts. This is accomplished in the head module by not propagating the hormone until all its local actions (DOF1 moving from 0 to 90) are completed.

Notice that the loop configuration is a cyclic network and module types are no longer sufficient to determine local actions (in fact all modules in the loop have the same type T16). In general, additional local variables, such as Head, may be necessary to ensure the global collaborations between modules in a cyclic network. Setting of these additional local variables may be performed using distributed control as well.

Figure 16:
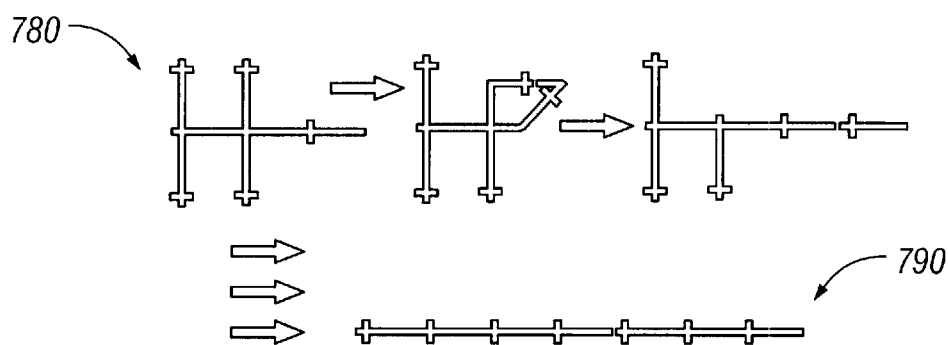
FIG. 16 illustrates reconfiguration of a quadruped robot into a snake robot.

Hormone-inspired distributed control can also be applied to the control of a cascade of actions, where actions are organized in a hierarchical structure and a single action in a higher-level can trigger a sequence of lower-level actions. FIG. 16 illustrates reconfiguration of a quadruped robot 780 into a snake robot 790. The robot 780 first connects its tail with one of the feet, and then disconnects the connected leg from the body so that the leg is assimilated into the tail. After this leg-tail assimilation is performed four times, the result is the snake configuration 790.

To control this reconfiguration, the high-level actions are a sequence of leg-tail assimilations, while the lower-level actions are those that enable the tail to find a foot, to align and dock with the foot, and then disconnect the leg from the body. Using hormones, the control of the reconfiguration can be accomplished as follows.

One module in the robot first generates a hormone (called LTS for changing Legs To Snake). This LTS hormone is propagated to all modules, but only the foot modules (which are types T5 or T6) will react. Each foot module will start generating a new hormone RCT to Request to Connect to the Tail. Since there are four legs at this point, four RCT hormones are propagating in the system. Each RCT carries the information about its propagation path (propagation path is a concatenation of all the sender connectors and receiver connectors through which the hormone has been sent so any module along the path can trace back to the original sender.).

A RCT hormone will trigger the tail module (type T2) to do two things: inhibit its receptor for accepting any other RCT hormones, and acknowledge the sender (using the path information in the received RCT) with a TAR (Tail Accept Request) hormone. Upon receiving the TAR hormone, the selected foot module first terminates its generation of RCT, and then generates a new hormone ALT (Assimilate Leg into Tail) to inform all the modules in the path to perform the lower-actions of bending, aligning, and docking the tail to the foot.

The details of these lower-level actions are described above in connection with FIG. 5. When these actions are terminated, the new tail module will activate its receptor for accepting other RCT hormones, and another leg assimilation process will be performed. This procedure is repeated until all legs are assimilated, regardless of how many legs are to be assimilated.

Table 6 lists an example sequence of hormone activities for assimilating four legs as shown in FIG. 16. This is an example of hormone activities for cascade actions.

TABLE 6

| Hormones | Actions |
| --- | --- |
| LTS | Start the reconfiguration |
| $RCT_1$, $RCT_2$, $RCT_3$, $RCT_4$ | Legs are activated to generate $RCT_1$ |
| TAR, $RCT_2$, $RCT_3$, $RCT_4$ | The tail accepts a RCT, and leg1 stops $RCT_1$ |
| ALT, $RCT_2$, $RCT_3$, $RCT_4$ | The tail and leg1 perform the assimilation process |
| TAR, $RCT_2$, $RCT_4$ | The new tail accepts a RCT, and leg3 stops $RCT_3$ |
| ALT, $RCT_2$, $RCT_4$ | The tail and leg3 perform the assimilation process |
| TAR, $RCT_2$ | The tail accepts a RCT, and leg4 stops $RCT_4$ |
| ALT, $RCT_2$ | The tail and leg4 perform the assimilation process |
| TAR | The new tail accepts a RCT, and leg2 stops $RCT_2$ |
| ALT | The tail and leg2 perform the assimilation process No more RCT, and the end the reconfiguration |

In classic inverse kinematics theory, the tail-attaching action is a hyper-redundant problem. To bring the tail to its docking position, some intensive matrix computation may be performed to determine the bending angles for all the modules involved in the action. Multiple solutions do exist, so that a system design may make a choice among solutions based on the domain knowledge. In the context of hormone-based control, however, a technique called near-regular-polygon may be used to derive a solution that is efficient to compute and suitable for hormones.

Figure 17:
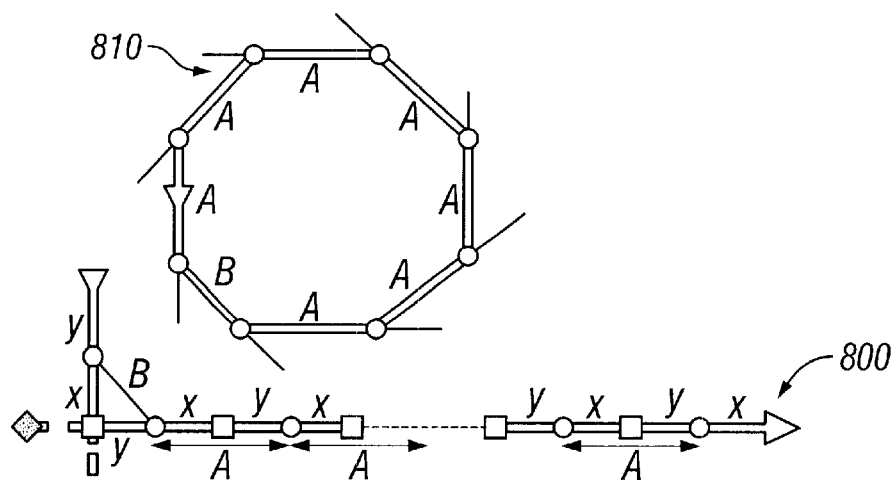
FIG. 17 illustrates a near-regular-polygon technique for tail-attaching.

FIG. 17 illustrates a near-regular-polygon technique for tail-attaching. A scorpion configuration 800 represents each module by a segment between two squares (i.e., the squares are joint connectors and the circles are DOF). The objective is to dock the tail connector, which is marked by a triangle, to a leg connector, which is another triangle. The problem is easier if the tail is to be attached to the head, marked by a diamond, for then the entire body could form a regular polygon with the length of each edge equal to the length of a module (A=x+y). In this case, each DOF bends $(360/N)°$, where N is the number of modules in the loop. The situation of attaching the tail to a leg is more complicated, because a leg is perpendicularly attached to the body, so one of the edges in the final loop has a length $B=(x^2+y^2)^{1/2}$ and B<A. However, realizing that the final loop is a near-regular polygon 810 with equal length edges except one, and the angles $\alpha$ and $\beta$ have the relation $(N-2)\alpha+2\beta=360°$, the answers for a and P can be found by a hill-climbing search approach, as shown in the following algorithm:

Let $\alpha=360/N$ and $\eta=IR\_Approximate\_Sense(Mtail)$,
1. $\alpha=\alpha+\Delta$, /* $\Delta$ is a small constant */
2. $\beta=(360-(N-2)\alpha)/2$,
3. Move DOFs using $\alpha$ and $\beta$,
4. $\eta'=IR\_Approximate\_Sense(Mtail)$,
5. If $\eta<\eta'$, then $\eta=\eta'$ and goto 1,
6. If $\eta\geq\eta'$, then stop.

As can be seen, this algorithm terminates when the IR approximate sensor value reaches a maximal point. This is a closed loop converging algorithm. In a self-reconfigurable robot where motors do not have high-precision controls, a closed-loop converging algorithm may be more reliable than an open-loop algorithm.

The synchronization techniques described above have used hormones to serially synchronize robot modules to create a global behavior. However, hormones may also be used to perform parallel synchronization. In parallel synchronization many actions start at the same time, for example a spider robot should move its legs simultaneously to perform a successful walking gait. After performing a current action, a new action is selected and started synchronously using a signal of when to start the action.

A hormone-based synchronization algorithm, which runs on each module in parallel, may be used to provide a common starting time for synchronized actions. Generally, for a given task, a module can infer that all other modules have selected and are ready to start their actions when the module receives an expected number of action-selection or synchronization hormones from all of its neighbors. The expected number of hormones for a neighbor is the number of active links of that neighbor. Two types of hormones may be used for this synchronization: (1) action-specifying hormones (ASH), and (2) synchronization hormones (SH). For example:

ASH(task, action, LT, maxTime)

SH(task, label (list of hormones), LT, maxTime)

In performing a task, when a module selects an action, it generates and propagates an action-specifying hormone, e.g. ASH(move, a1 ,0, 10). Each link stores the received hormones from its neighbor in its buffer. When the number of stored hormones is equal to the number of the neighbor's active links (i.e., the expected number of hormones), the module sends a synchronization hormone to the rest of the neighbors. The new hormone contains the received hormones labeled with the buffer name. For example, if the above action-specifying hormone is received from a neighbor with one active link and the buffer name is 1$b$, the synchronization hormone will be: SH(move, lb(ASH(move, a1 ,0, 10)), 0, 10). Receivers count the synchronization hormone as one received hormone. Although the content of the ASH and SH are not required for the synchronization purpose, they are kept by the modules for use in conflict resolution, which is described below.

Figure 18:
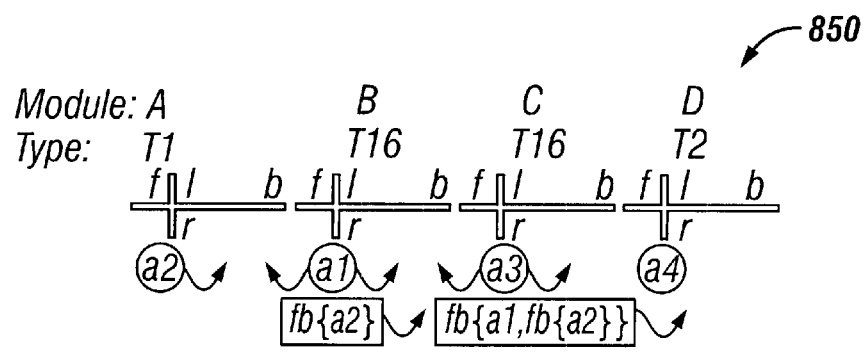
FIG. 18 shows a four-module caterpillar robot and messages that may be used in parallel synchronization.

FIG. 18 shows a four-module caterpillar robot 850 and messages that may be used in parallel synchronization. The following is a detailed example of parallel action synchronization of the four-module caterpillar robot 850. For simplicity, it is assumed that the robot is performing only one task, and only actions are represented in the internal representation of received hormones. The type of each module is shown according to Table 1. The number of active links of modules A to D is 1-2-2-1, respectively, which defines the expected number of hormones for each connection.

For example, A expects 2 hormones from its bf neighbor module B (for B has 2 active links). C expects 2 hormones from its fb neighbor (B) and 1 hormone from its bf neighbor D (for D has 1 active link). FIG. 18 shows the hormones that have been propagated. ASHs are shown in circles and SHs are shown in rectangles. Module 'B' ('C') has received the expected number of hormones from 'A' ('B') and has propagated a SH to 'C' ('D'). The buffer contents of the modules after receiving the hormones are:

[bf(?),fb$\{a_1$,fb$\{a_2\}\}$] [bf$\{a_1$,?$\}$] [fb$\{a_2\}$,bf$\{a_3$,?$\}$] [fb$\{a_3$, fb$\{a_1$,fb$\{a_2\}\}\}$]

The '?' sign represents hormones that are expected. For example, B has two active link buffers: fb expected 1 and received 1 hormone, $a_2$, and bf expected 2 but received 1 hormone, $a_3$ (so it has a "?"). This synchronization process is complete when 'D' propagates its action, $a_4$. It causes modules 'C', 'B', and 'A' to receive all of the expected hormones and together with module 'D', start execution of their actions. The internal representation of modules after completion of the synchronization process is shown in Table 7 below.

TABLE 7

| Module | Internal representation |
| --- | --- |
| A | [$a_2$, [bf$\{a_1$, bf$\{a_3$, bf$\{a_4\}\}\}$]] |
| B | [$a_1$, [fb$\{a_2\}$, bf$\{a_3$, bf$\{a_4\}\}$]] |
| C | [$a_3$, [bf$\{a_4\}$, fb$\{a_1$, fb$\{a_2\}\}$]] |
| D | [$a_4$, [fb$\{a_3$, fb$\{a_1$, fb$\{a_2\}\}\}$]] |

Compared to the centralized control system with a standard message passing protocol, which requires $O(n^2)$ message hops for each synchronized action (because n messages must be sent to n modules), hormone-based mechanism requires only $O(t^2n)$ hops (because each module generates t messages and relays t(t−1) messages), where n is the number of modules in the configuration and t is the number of its active links, where 1<=t<=4. The total time for synchronization is $O(cn+L)$, where c is the constant processing time for sending out a message, and L is the longest time needed for a module to complete its local action in the current configuration.

The properties of hormones may make them ideal for specifying tasks in a distributed system with near-minimal communications. This process is initialized by a task-specifying hormone TSH, whose format is: TSH(task, gait, module-type, LT, maxTime).

Upon receiving a task-specifying hormone, a module selects a gait based on its type. The type of a module usually gives useful information about the type of gaits that a module can perform. For example, if all modules of a robot are of type T1, T2, and T16, which creates a caterpillar shaped robot, then it will be able to perform a caterpillar gait. In situations where a module can perform more than one gait, the module selects what is more suitable for most of the modules.

Therefore, if gait selection is done synchronously, all modules can find out what other modules have selected and choose the right gait. For example, when module A in FIG. 18 receives TSH(move, null, null, 0, 10), it selects a caterpillar gait, and generates and propagates a new task-specifying hormone, TSH(move, caterpillar, T1, 0, 10), to other modules. When all modules complete the parallel synchronization, they have selected the appropriate gait and are ready to select their actions. Action-selection also goes through a synchronization process, and when all modules complete their action selection, they start executing their actions. This loop of action ,selection, synchronization, and execution continues until new task-specification hormones are received.

In the description above, it was assumed that when modules select and synchronize their actions, there is no conflict among the selected actions. In reality, since modules select actions independently, it is possible that actions of two modules violate some constraints in their gait definition. Therefore a conflict resolution phase may be used. The first step in conflict resolution is constraint checking. This involves checking the selected actions in the internal representation, gathered during the action selection phase such as the ones described in connection with FIG. 18, against the constraints.

A constraint matches the internal representation of a module if there is an exact match between the link-pairs of a constraint and a sequence of labels connecting two actions in the internal representation. For example, the constraint given in the caterpillar gait, i.e. ($a_x$)=fb next ($a_x$) matches "$a_1$ fb $a_2$" because $a_x=a_1$ and next $(a_x)=a_2$ according to the action order specified in the gait. However, "a3 fb $a_1$" does not match the constraint, and one of the actions should be changed.

The decision of which action to change can be based on the Life-Time (LT) of the action-specifying hormone. Between the two actions the one with smaller LT value can be selected. If conflict is detected before propagation, the selected action can be changed and a consistent action propagated. However, in situations where the action is already propagated, a conflict-resolution hormone (CRH) can be propagated. The format of CRH may be: CRH(task, ASH, constraint , LT, maxTime).

A CRH contains the conflicting hormone and the violated constraint. In the above example, assuming that the hormone containing $a_3$ has a smaller LT, the generated CRH is: CRH(move, ASH (move, $a_3$, 0, 10), ($a_3$ fb $a_1$), 0, 10). If a receiving module has the conflicting ASH in its internal representation, it deletes that hormone, update the number of received hormones in the receiver buffer, and propagate the CRH. Otherwise, the receiving module ignores the received CRH.

When the module whose action is the source of conflict receives the CRH, it selects an action that satisfies the constraint included in the CRH and generates a new ASH containing the new action and propagate the hormone. In the above example, module 'C', which selected $a_3$, re-selects action $a_0$ and generate a new ASH. If module 'D' receives the new ASH before propagating its selected action, it will select a consistent action, which in this case is $a_4$.

The activities described above may be part of an algorithm, such as the following:

```
When a (task) received do
}
   Select a gait with Parallel Synchronization & Conflict
      Resolution;
   If (the synchronization of the selected gait is "Parallel")
   }
      selectAction(selectedGait)
      While (task-specification hormone is active)
      {
   propagte(selectedAction);
   parallelSynchronization&ConflictResolution( );
   execute(selectedAction);
   selectNextAction(selectedAction, selectedGait);
      }
   }
   If (the synchronization of the selected gait is "Serial")
   {
      selectAction(selectedGait);
      While (task-specification hormone is active)
      {
         execute(selectedAction);
         propagte(selectedAction);
         selectNextAction(selectedAction, selectedGait)
      }
   }
}
```

This algorithm may run locally and autonomously at each robot module. In addition, multiple hormones may be used simultaneously in the same robotic system to generate a global behavior. For example, multiple hormones may be generated and managed in a self-reconfigurable robot to implement locomotion.

The caterpillar-move gait described above can move the robot along its body and a caterpillar-turn gait, as described below, can bend the body to the side. The combination of these two gaits can generate a circular trajectory. The caterpillar-turn gait can be defined as:

Synchronization: Parallel.

Actions: A list of actions ($a_5$–$a_6$), which sets the DOF2 to the specified value: ($a_5 \rightarrow 0°$, $a_6 \rightarrow 10°$)

Constraint: $(a_x)$ !=+$a_6$, which means there can not be two modules in the robot that perform the $a_6$ action at the same time.

Local constraints: Synchronization between two gaits are performed using the following local constraints:
if ($a_x=a_4$ & $a_y=a_6$) then next($a_y$)=bf($a_y$)
if ($a_x=a_3$) then next($a_y$)=bf($a_y$)

The last two constraints are used to identify the next action of a module. They ensure that the next action of a module is the action performed by its back neighbor. Along with the constraint that restricts the bending to one and only one module, this gait shifts the bent-action between a unique pair of modules who are performing the caterpillar move.

The various implementations described above have been presented by way of example only, and not limitation. For example, the logic flows depicted and described do not require the particular order shown, or sequential order, to achieve desirable results. In certain implementations, multitasking and parallel processing may be preferable.

Other embodiments may be within the scope of the following claims.

What is claimed is:

1. A method comprising:

discovering a communication connection to autonomous agents communicatively coupled together in a reconfigurable network topology;

determining a local topology including a type of the communication connection;

receiving a control message having content; and in response to the control message, determining an action based upon the received message content and the determined local topology.

2. The method of claim 1, wherein said determining the communication connection type comprises identifying a first communication port and a second communication port, the first and second communication ports being communicatively coupled by the communication connection.

3. The method of claim 2, wherein said identifying the first and second communication ports comprises identifying orientations of the first and second communication ports with respect to one or more defined references.

4. The method of claim 3, wherein said identifying the orientations of the first and second communication ports comprise:

identifying a first orientation of the first communication port with respect to a first robot module coupled with the first communication port, the first robot module being one of the one or more defined references; and identifying a second orientation of the second communication port with respect to a second robot module coupled with the second communication port, the second robot module being another of the one or more defined references.

5. The method of claim 2, wherein said determining the action comprises determining whether to perform a locally selected action or no action and determining whether to propagate the control message or to not propagate the control message.

6. The method of claim 5, wherein the communication connection comprises a first communication connection, the method further comprising:

discovering a second communication connection, and said receiving the control message comprises receiving the control message over the second communication connection.

7. The method of claim 6, further comprising propagating the control message to the first communication connection based upon the local topology.

8. The method of claim 7, wherein said propagating the control message comprises:

changing the control message; and transmitting the changed control message over the first communication connection.

9. The method of claim 7, further comprising performing the locally selected action.

10. The method of claim 2, wherein the control message comprises a first control message, the action comprises a maneuver, and wherein said determining the action comprises:

based upon a locally selected action, the first control message and the local topology, generating a second control message to coordinate collective behavior of the autonomous agents.

11. The method of claim 10, wherein said determining the action further comprises:

transmitting the second control message;

receiving additional control messages to coordinate the collective behavior of the autonomous agents;

resolving conflicts among actions of the autonomous agents, including the locally selected action; and performing the maneuver.

12. The method of claim 1, further comprising:

before each of a plurality of maneuvers, repeating said discovering a communication connection and said determining a local topology; and performing the plurality of maneuvers in collaboration with the autonomous agents to effect collective behavior.

13. The method of claim 12, wherein the autonomous agents comprise robot modules coupled together to form a self-reconfigurable robot, and wherein the collective behavior is reconfiguration or locomotion of the self-reconfigurable robot.

14. A robotic system comprising:

a plurality of robot modules in communication with each other and forming a reconfigurable network topology; each robot module comprising:

one or more actuators to cause movement of the robot module;

a communication interface to send and receive messages to and from the other robot modules, the communication interface forming one or more communication connections; and a machine-readable medium embodying information indicative of instructions for causing the robot module to perform operations comprising:

sending control signals to the one or more actuators to cause the robot module to perform actions; and before each of the actions, discovering a local topology including one or more types of the one or more communication connections.

15. The system of claim 14, wherein said discovering the local topology comprises determining mutual communication connection ports used on either side of the one or more communication connections.

16. The system of claim 15, wherein the operations further comprise:

receiving a control message having content; and in response to the control message, determining a current action based upon the received message content and the determined local topology.

17. The system of claim 14, wherein each robot module further comprises four connectors to physically link the robot module with the other robot modules to create a self-reconfigurable robot.

18. The system of claim 17, wherein the communication interface comprises four optical transceivers to communicatively link the robot module with the other robot modules.

19. The system of claim 17, wherein the messages provide distributed control of the reconfigurable robot by propagating through the reconfigurable robot based upon the discovered local topology to coordinate collective behavior of the reconfigurable robot.

20. The system of claim 19, wherein the collective behavior comprises locomotion of the self-reconfigurable robot.

21. A robot module comprising:

means for coupling with a plurality of robot modules;

means for discovering local topology between each of a plurality of maneuvers; and means for performing the plurality of maneuvers in collaboration with the plurality of robot modules to effect collective behavior.

22. The robot module of claim 21, wherein the means for coupling comprises four connectors and four optical transceivers.

23. The robot module of claim 21, wherein the means for discovering local topology comprises:

means for establishing an active communication link with another robot module; and means for determining mutual communication connection ports used on either side of the active communication link.

24. The robot module of claim 21, wherein the means for performing the plurality of maneuvers comprises:

one or more actuators; and means for generating messages to coordinate the collective behavior by triggering multiple different behaviors in the plurality of robot modules.

25. The robot module of claim 21, wherein the collective behavior comprises reconfiguration of the plurality of robot modules to form a reconfigured network topology.

26. A machine-readable medium embodying information indicative of instructions for causing one or more machines to perform operations comprising:

discovering a communication connection to autonomous agents communicatively coupled together in a reconfigurable network topology;

determining a local topology including a type of the communication connection;

receiving a control message having content; and in response to the control message, determining an action based upon the received message content and the determined local topology.

27. The machine-readable medium of claim 26, wherein said determining the communication connection type comprises identifying a first communication port and a second communication port, the first and second communication ports being communicatively coupled by the communication connection.

28. The machine-readable medium of claim 27, wherein said identifying the first and second communication ports comprises identifying orientations of the first and second communication ports with respect to one or more defined references.

29. The machine-readable medium of claim 28, wherein said identifying the orientations of the first and second communication ports comprises:

identifying a first orientation of the first communication port with respect to a first robot module coupled with the first communication port, the first robot module being one of the one or more defined references; and identifying a second orientation of the second communication port with respect to a second robot module coupled with the second communication port, the second robot module being another of the one or more defined references.

30. The machine-readable medium of claim 26, wherein said determining the action comprises determining whether to perform a locally selected action or no action and determining whether to propagate the control message or to not propagate the control message.

31. The machine-readable medium of claim 30, wherein the communication connection comprises a first communication connection, and the operations further comprise:

discovering a second communication connection, and said receiving the control message comprises receiving the control message over the second communication connection.

32. The machine-readable medium of claim 31, wherein the operations further comprise propagating the control message to the first communication connection based upon the local topology.

33. The machine-readable medium of claim 32, wherein said propagating the control message comprises:

changing the control message; and transmitting the changed control message over the first communication connection.

34. The machine-readable medium of claim 32, wherein the operations further comprise initiating performance of the locally selected action.

35. The machine-readable medium of claim 26, wherein the control message comprises a first control message, the action comprises a maneuver, and wherein said determining the action comprises:

based upon a locally selected action, the first control message and the local topology, generating a second control message to coordinate collective behavior of the autonomous agents.

36. The machine-readable medium of claim 35, wherein said determining the action further comprises:

transmitting the second control message;

receiving additional control messages to coordinate the collective behavior of the autonomous agents;

resolving conflicts among actions of the autonomous agents, including the locally selected action; and initiating performance of the maneuver.

37. The machine-readable medium of claim 26, wherein the operations further comprise:

before each of a plurality of maneuvers, repeating said discovering a communication connection and said determining a local topology; and initiating performance of the plurality of maneuvers in collaboration with the autonomous agents to effect collective behavior.

38. The machine-readable medium of claim 37, wherein the autonomous agents comprise robot modules coupled together to form a self-reconfigurable robot, and wherein the collective behavior is reconfiguration or locomotion of the self-reconfigurable robot.

* * * * *